US012719876B2

(12) United States Patent
Pan et al.

(10) Patent No.: US 12,719,876 B2
(45) Date of Patent: Aug. 25, 2026

(54) CONTROLLING ACCESS TO DATA IN A CLOUD-BASED SOFTWARE PLATFORM BASED ON APPLICATION AUTHORIZATION

(71) Applicant: STRIPE, LLC, South San Francisco, CA (US)

(72) Inventors: Bowen Pan, Belmont, CA (US); Gabriel Hurley, Oakland, CA (US); Timothy James Fontaine, San Francisco, CA (US); Toluwaloju Elizabeth Alabi, San Francisco, CA (US); Julia Chaves, Oakland, CA (US); Justin Tulloss, Truckee, CA (US)

(73) Assignee: Stripe, LLC, South San Francisco, CA (US)

( * ) Notice: Subject to any disclaimer, the term of this patent is extended or adjusted under 35 U.S.C. 154(b) by 275 days.

(21) Appl. No.: 18/094,184

(22) Filed: Jan. 6, 2023

(65) Prior Publication Data

US 2024/0236101 A1 Jul. 11, 2024

(51) Int. Cl.
*H04L 9/40* (2022.01)
*G06F 21/62* (2013.01)

(52) U.S. Cl.
CPC ........ *H04L 63/102* (2013.01); *G06F 21/6218* (2013.01)

(58) Field of Classification Search
CPC ............. G06F 21/6218; G06F 21/6227; G06F 21/6209; G06F 21/553; H04L 63/101; H04L 63/102
USPC .............................................................. 726/4
See application file for complete search history.

(56) References Cited

U.S. PATENT DOCUMENTS

| | | | | |
|---|---|---|---|---|
| 8,161,075 | B1 | 4/2012 | Long | |
| 8,756,617 | B1 | 6/2014 | Boodman | |
| 9,027,154 | B2 * | 5/2015 | Xi | H04L 63/102 726/27 |
| 9,110,577 | B1 | 8/2015 | Alur et al. | |
| 9,197,419 | B1 * | 11/2015 | Chandrasekhar | G06F 21/604 |
| 9,432,335 | B1 | 8/2016 | Stevenson | |

(Continued)

FOREIGN PATENT DOCUMENTS

WO WO-2016090338 A1 6/2016

OTHER PUBLICATIONS

Notice of Allowance dated Jun. 6, 2024 for U.S. Appl. No. 18/094,281, 11 pages.

(Continued)

*Primary Examiner* — Catherine Thiaw
*Assistant Examiner* — Amir Mahdi Hajiabbasi
(74) *Attorney, Agent, or Firm* — Finnegan, Henderson Farabow, Garrett & Dunner, LLP

(57) ABSTRACT

Aspects of the present disclosure relate to systems and methods for managing access to data in a cloud-based software platform. A first cloud-based software application generates first data associated with a user account on the cloud-based software platform. A second cloud-based software application may also be connected to the user account and request access to the first data generated by the first application. The user account sets a collection of access permissions on the first data, where the second cloud-based software application is granted access to the first data subject to the collection of access permissions.

16 Claims, 10 Drawing Sheets

(56) References Cited

U.S. PATENT DOCUMENTS

| | | | | |
|---|---|---|---|---|
| 10,496,842 | B1 * | 12/2019 | Ren | H04L 63/1433 |
| 10,834,086 | B1 * | 11/2020 | Borowiec | H04L 63/101 |
| 11,107,580 | B1 | 8/2021 | Felton | |
| 11,115,417 | B2 * | 9/2021 | Khait | H04L 63/102 |
| 11,245,744 | B1 | 2/2022 | Brevoort et al. | |
| 11,289,200 | B1 | 3/2022 | Gregg | |
| 11,444,903 | B1 | 9/2022 | Brevoort et al. | |
| 11,455,166 | B2 | 9/2022 | Brevoort et al. | |
| 11,558,453 | B2 | 1/2023 | Brevoort et al. | |
| 2005/0021405 | A1 | 1/2005 | Agarwal | |
| 2006/0206931 | A1 * | 9/2006 | Dillaway | H04L 63/0823 726/9 |
| 2007/0201654 | A1 | 8/2007 | Shenfield | |
| 2008/0022370 | A1 * | 1/2008 | Beedubail | H04L 63/101 726/4 |
| 2009/0182565 | A1 | 7/2009 | Erickson | |
| 2012/0102485 | A1 | 4/2012 | Goldman | |
| 2012/0159572 | A1 * | 6/2012 | Patel | H04L 63/102 726/3 |
| 2014/0047509 | A1 * | 2/2014 | Bhogal | G06F 21/6218 726/4 |
| 2014/0215604 | A1 * | 7/2014 | Giblin | G06F 21/6218 726/21 |
| 2016/0012465 | A1 | 1/2016 | Sharp | |
| 2016/0036822 | A1 * | 2/2016 | Kim | G06F 21/6236 726/4 |
| 2016/0080391 | A1 * | 3/2016 | Hasegawa | H04W 12/088 726/4 |
| 2016/0335058 | A1 | 11/2016 | Weckwerth | |
| 2017/0235559 | A1 | 8/2017 | Saenz | |
| 2017/0244810 | A1 | 8/2017 | Ryan | |
| 2017/0353466 | A1 * | 12/2017 | Weaver | H04L 63/101 |
| 2018/0013750 | A1 * | 1/2018 | Maurer | H04L 63/102 |
| 2018/0143949 | A1 | 5/2018 | Stachowicz | |
| 2018/0314845 | A1 * | 11/2018 | Anderson | G06F 21/32 |
| 2018/0352005 | A1 * | 12/2018 | Gaddam | H04L 63/205 |
| 2019/0207866 | A1 | 7/2019 | Pathak | |
| 2019/0332808 | A1 | 10/2019 | Dunjic | |
| 2019/0362018 | A1 | 11/2019 | Salomon | |
| 2019/0379724 | A1 * | 12/2019 | Roche, Jr. | G06F 16/1748 |
| 2019/0392657 | A1 | 12/2019 | Hadzic | |
| 2020/0019414 | A1 | 1/2020 | Byard | |
| 2020/0057671 | A1 | 2/2020 | Bailey | |
| 2020/0204574 | A1 | 6/2020 | Christian | |
| 2020/0259852 | A1 | 8/2020 | Wolff | |
| 2020/0267090 | A1 * | 8/2020 | Cahill | H04L 63/101 |
| 2020/0322347 | A1 * | 10/2020 | Goyal | G06Q 10/101 |
| 2020/0412709 | A1 * | 12/2020 | Huang | H04L 63/105 |
| 2021/0056222 | A1 * | 2/2021 | Vishnyakov | G06F 16/2456 |
| 2021/0117557 | A1 | 4/2021 | Al-Shanqity | |
| 2021/0117719 | A1 | 4/2021 | Tiwary | |
| 2021/0149688 | A1 | 5/2021 | Newell et al. | |
| 2021/0152541 | A1 | 5/2021 | Caldwell | |
| 2021/0352137 | A1 * | 11/2021 | Fahlbusch | H04L 67/1097 |
| 2021/0406391 | A1 * | 12/2021 | Philip | H04L 63/105 |
| 2022/0060523 | A1 | 2/2022 | Brevoort et al. | |
| 2022/0092713 | A1 | 3/2022 | Bracken | |
| 2022/0114267 | A1 * | 4/2022 | Schwartz | G06F 21/6209 |
| 2022/0245557 | A1 | 8/2022 | Minter | |
| 2022/0337593 | A1 * | 10/2022 | Burckhardt | G06F 21/6218 |
| 2022/0366494 | A1 | 11/2022 | Cella | |
| 2022/0414526 | A1 | 12/2022 | Darrah | |
| 2023/0019026 | A1 | 1/2023 | Agarwal | |
| 2023/0081429 | A1 | 3/2023 | Babtkis | |
| 2023/0087481 | A1 * | 3/2023 | Brevoort | H04L 63/102 726/27 |
| 2023/0123496 | A1 | 4/2023 | David | |
| 2023/0128661 | A1 | 4/2023 | Ahmed | |
| 2023/0281256 | A1 * | 9/2023 | Kocienda | G06F 1/163 707/722 |
| 2024/0020400 | A1 * | 1/2024 | Chen | G06F 21/6227 |
| 2024/0106828 | A1 * | 3/2024 | Jain | H04L 67/1001 |
| 2024/0134852 | A1 | 4/2024 | Zhong | |
| 2024/0169085 | A1 | 5/2024 | Soni | |

OTHER PUBLICATIONS

Notice of Allowance date May 16, 2024 for U.S. Appl. No. 18/094,290, 17 pages.

Asgarnezhad, Marzieh et al., "Analysis and Evaluation of Two Security Services in SOA," 2010 Fifth International Conference on Internet and Web Applications and Services, 2010 IEEE, pp. 562-568.

International Search Report and Written Opinion for International Application No. PCT/US2024/010766, dated Apr. 15, 2024, 16 pages.

Ranchal, Rohit et al., "Privacy Preserving Access Control in Service-Oriented Architecture," 2016 IEEE International Conference on Web Services (ICWS), IEEE, Jun. 27, 2016, pp. 412-419.

Notice of Allowance dated Jun. 12, 2024 for U.S. Appl. No. 18/094,289, 21 pages.

Office action for U.S. Appl. No. 18/094,290 dated Oct. 25, 2023, 8 pages.

Voisin, Craig, Mikael Linden, Stephanie OM Dyke, Sarion R. Bowers, Pinar Alper, Maxmillian P. Barkley, David Bernick et al. "GA4GH Passport standard for digital identity and access permissions," Cell Genomics 1, No. 2 (2021). (Year: 2021).

Non-Final Office Action dated Feb. 12, 2025 for U.S. Appl. No. 18/094,217, 23 pages.

* cited by examiner

CONTROLLING ACCESS TO DATA IN A CLOUD-BASED SOFTWARE PLATFORM BASED ON APPLICATION AUTHORIZATION

BACKGROUND

A cloud-based software platform provides services, such as data storage services, to its client organizations. Software developers may develop software applications that run on the cloud-based software platform, where these applications may access the data stored on the cloud-based software platform.

SUMMARY

Aspects of embodiments of the present disclosure relate to systems and methods for controlling access to data stored in a cloud-based software platform. Some aspects of embodiments relate to coordinating the transfer of data between applications running on the cloud-based software platform through defined data schemas. Some aspects of embodiments relate to providing its users (e.g., client organizations) of the cloud-based software platform to control whether applications running on the cloud-based software platform access can access the user data and the extent of the access to the user data. Some aspects of embodiments relate to controlling access to data by end-user accounts associated with the user in accordance with end-user roles of the client organization.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1:
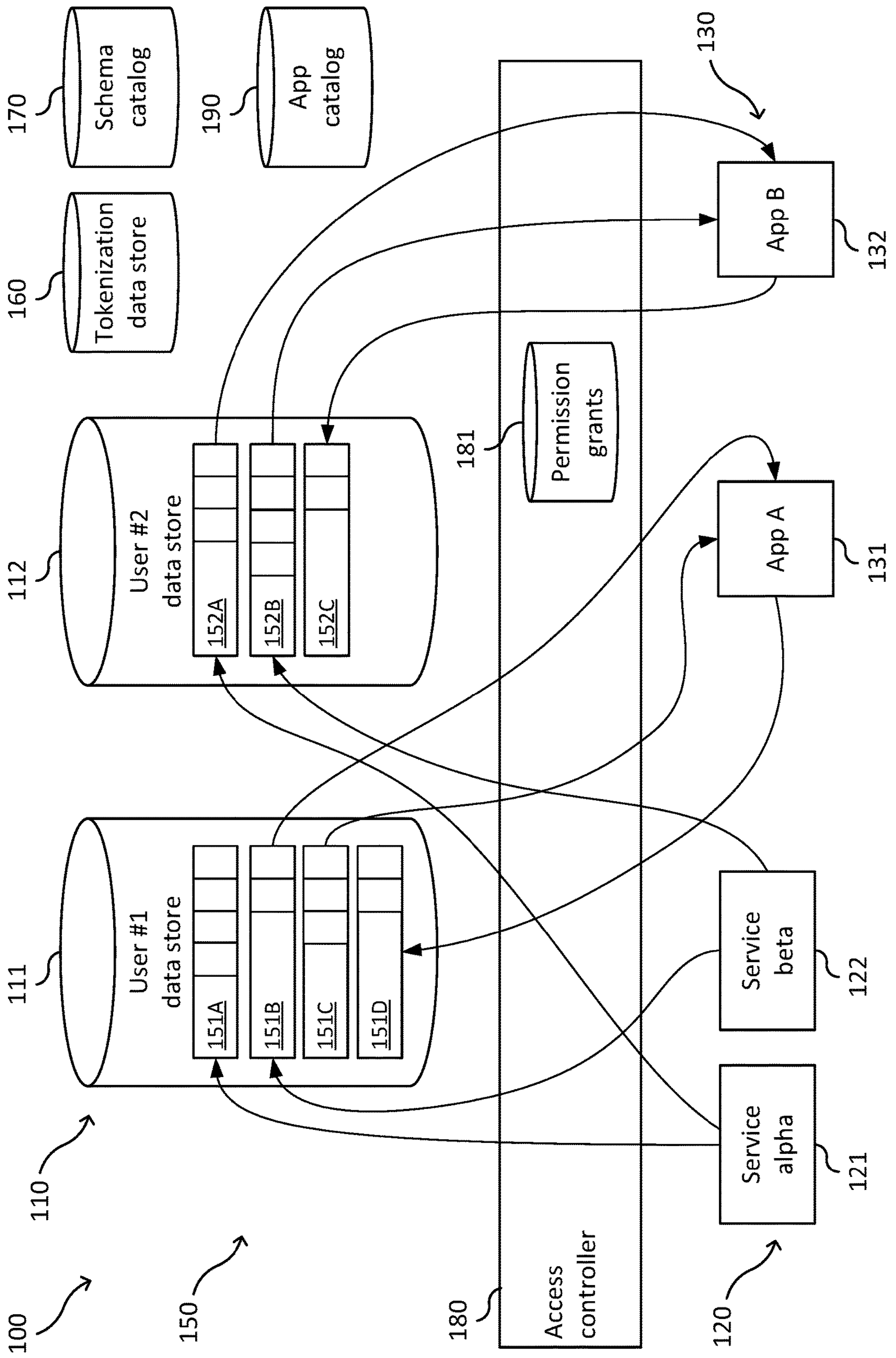
FIG. 1 is a block diagram depicting a cloud-based software platform in which data exchange between different entities is a mediated by an access controller according to embodiments of the present disclosure.

In the following detailed description, only certain exemplary embodiments of the present disclosure are shown and described, by way of illustration. As those skilled in the art would recognize, the disclosure may be embodied in many different forms and should not be construed as being limited to the embodiments set forth herein. Like reference numerals designate like elements throughout the specification.

Aspects of embodiments of the present disclosure relate to controlling access to data stored in a cloud-based software platform that provides various services to its users (e.g., client organizations, customers). In the process of providing these services to its users, various client organization data are generated and stored. FIG. 1 is a block diagram depicting a cloud-based software platform in which data exchange between different entities is a mediated by an access controller according to embodiments of the present disclosure. As shown in FIG. 1, the cloud-based software platform includes data stores 110 associated with separate users of the cloud-based software platform, where each user is, for example, an organization that is a direct customer or user of the cloud-based software platform. The user may be a business subscriber to the cloud-based software platform, where the business uses the cloud-based software platform to provide higher level services to its customers, for example, the user may be a retailer that uses transaction processing services provided by the cloud-based software platform to process transactions initiated by the organization's retail customers (e.g., purchasers of the retail products). The cloud-based software platform may be implemented using specialized software executed by one or more computer systems, as described in more detail below with respect to FIGS. 6, 7, and 8, e.g., to provide the cloud-based software platform as software as a service (SaaS). While the data stores 110 are shown in FIG. 1 as separate blocks, in practice, the data stores corresponding to different customers may be stored in the same or different physical devices and implemented using various types of data storage software (e.g., relational databases, object storage databases, key-value stores, and the like). Some aspects of embodiments of the present disclosure relate to data access controls enforced by the cloud-based software platform 100 to grant or deny access to various data based on the permissions associated with a party attempting to access the data (e.g., to prevent one user from accessing data belonging to another user without permission from the owner of the data).

Generally, the cloud-based software platform 100 will be described herein as providing various transaction processing services 120 and therefore will generate data representing the transaction, where these data may be stored in the data stores 110 (or data storage buckets) associated with the affected users. The services may include, for example, maintaining account balances of funds, charging against a given credit card or debit card, storing and retrieving files, initiating payments to third parties, issuing refunds, fraud detection services, invoice generation services, and the like.

Interacting with these services initiate various transactions. For example, charging a credit card or debit card may create a transaction in which the charge to the credit card is approved or denied and which may be subject to a hold until the funds are added to an account. As another example, uploading a file may create a transaction, where the transaction may progress through various states (e.g., uploading, upload completed, deleted, etc.).

The users of the cloud-based software platform may be businesses that interact with their own customers, and the data stored in the cloud-based software platform may include customer data (e.g., customer contact information and payment data). For example, a retail website may use the cloud-based software platform to support the delivery of goods and services, such as receiving payments from customers for goods and services that are provided, storing payment information for recurring payments (e.g., subscriptions), storing customer contact information for delivering goods, and the like. Accordingly, the user may use the services provided by the platform to construct systems for processing transactions with their customers and for performing transactions with third parties (e.g., vendors and employees).

In addition, software developers may develop software applications (or apps) 130 that run on the cloud-based software platform and that make use of the underlying services provided by the cloud-based software platform. Users of the cloud-based software platform may make use of these software applications (e.g., by adding those software applications to their accounts) to add the functionality provided therein, thereby saving the user (e.g., the organization subscribing to the cloud-based software platform 100) the effort of constructing these software applications on their own. For example, an application developer may create an app that manages the handling of typical retail transactions with customers, such as the creation and management of customer accounts, orders placed for various goods and services, customer subscription information, and the like. As another example, a product fulfillment business may provide a cloud-based software application that allows its users to offer its customers with shipping services (e.g., without requiring the user, which may be a retail business, to develop their own shipping solutions or to develop direct relationships with shipment providers such as the United States Postal Service), to handle returns processing, and to store inventory in a fulfillment center or warehouse. In some embodiments, software developers are also provided with data stores 110 that are used to store data owned by the software developer, such as where these data stores are used to store data associated with the operation of the apps 130 running on the cloud-based software platform 100. In some embodiments, the software applications that run on the cloud-based software platform are published in an app marketplace (e.g., an app store) or app catalog or app repository. Users can browse the app marketplace and select apps to connect (e.g. "install") to their accounts. In some embodiments, adding an application to an account adds a user interface component (e.g., an app component) for interacting with that application to a user interface that is presented to users of that account. More concretely, users may be presented with a dashboard user interface that presents information about their account and which includes one or more app components, where a given app component may be a functionality or UI component provided by the cloud-based software platform itself or by a third-party app developer (e.g., where the app component corresponds to an application developed by the third-party app developer). Accordingly, the third-party apps can be app components or features that plug into the cloud-based software platform (e.g., that include user interface components that plug into an existing user interface provided by the cloud-based software platform).

Software associated with the user interacts with the app to initiate various processes. For example, a website operated by the user may receive orders submitted by its customers. A web application implanting the website may then interact with a first app (e.g., App A 131) by generating an order event representing the customer order, where the app uses the order event to interact with various services (e.g., to perform the charge of the customer's credit card or debit card) and to handle returns and refunds as necessary. After determining that the charge transaction was successful (e.g., that the credit card or debit charge was approved) another app (e.g., App B 132) handles fulfillment of the order (e.g., maintaining the status of the order processing at the fulfillment center, such as processing, shipping, shipment tracking, delivery confirmation, returns processing, and the like). Therefore, these data may include a separate record or event associated with each transaction and may include additional events generated by the apps as the transactions progress between different states (e.g., in an order for physical goods, the states of the transaction may include initially receiving an order, processing the order, shipping the goods to the recipient, delivery of the goods to the recipient, replacement processing, refund processing, and the like).

As still another example, users of the cloud-based software platform may be providers of services to connected client accounts (e.g., accounts operated by entities who are small businesses). For example, a pizzeria support service may provide website templates and payment processing services (constructed from the services provided by the cloud-based software platform) that are tailored for the types of transactions commonly encountered by local restaurant (e.g., handling a highly customizable menu of goods to be sold, processing refunds of small transactions, handling a mix of payment types, payment of delivery drivers such as tipping, payment of vendors and suppliers, and the like). The cloud-based software platform may store data on behalf of its user (the pizzeria support service) which, in turn, receives data entrusted to it by its connected accounts (the individual pizzerias).

Coordinating these interactions between multiple parties within the cloud-based software platform involves the automatic transfer and processing of data exchanged between the users, the customers of those users, the clients of those users (if applicable), applications developed by the application developers, and the underlying services (or primitives) offered by the cloud-based software platform.

This context creates several technological problems to be solved, arising from the cloud-based software platform in which the data is housed. One problem relates to the coordination of data interchange formats between the different parties. Another problem relates to ensuring the privacy and security of the data stored by the system as well as compliance with industry and legal requirements for data storage (e.g., personally identifiable information (PII), payment card industry (PCI) data security standard (DSS), General Data Protection Regulation (GDPR), the California Consumer Privacy Act (CCPA), and the like). A third problem relates to controlling access to the data stored in the cloud-based software platform (e.g., so that a user cannot read or write data belonging to another user, while still allowing apps running on the cloud-based software platform to access and manipulate data for multiple different users.

Accordingly, some aspects of embodiments relate to coordinating, mediating, and brokering the transfer of data between applications running on the cloud-based software platform. Some aspects of embodiments relate to providing users of the cloud-based software platform with control over which portions of their data is accessible to applications running on the cloud-based software platform, by granting or denying permission for others (e.g., apps 130 running on the cloud-based software platform 100 or apps 130 running on computer systems outside the cloud-based software platform) to access these data, including granting access for different two different apps to exchange data associated with the same user. Some aspects of embodiments relate to controlling data that is visible to and/or modifiable by end-user accounts associated with the users in accordance with the user roles associated with those end-user accounts. Some additional aspects of embodiments of the present disclosure relate to establishing a catalog of data schemas to support the exchange of data between different apps running on the cloud-based software platform 130 and to provide a uniform interface for controlling permissions based on schema (e.g., a shape of the data to be shared). In some embodiments, the schemas are published in a schema catalog 170 such that those schemas are available for use by other users of the cloud-based software platform and such that third party apps can exchange data schemas and coordinate the exchange of information based on use of the same schemas. In addition, apps published in the app catalog 190 may link to schemas published in the schema catalog 170 to indicate compatibility with the linked schemas.

In some embodiments of the present disclosure, the exchange of data between different entities within the cloud-based software platform 100 will be described herein in the context of events 140, following a publish-subscribe (or pub-sub) messaging pattern. In such a messaging pattern, publishers publish messages (or events 140) onto message queues (e.g., time-ordered sequences of events). In some embodiments, an event is represented as structured data that includes one or more fields, which may include nested objects. For example, events may be represented using data formats such as JavaScript Object Notation (JSON), Extensible Markup Language (XML), and the like. This pattern enables asynchronous coordination of different actors in the system, such as where one party (e.g., one user) can submit a request to a service 120 or an app 130 and asynchronously receive a response without having to actively wait (or "block") or poll a service for a response. In some embodiments, a given message queue is associated with a single user data store 110 in the cloud-based software platform, such that events containing data owned by different users are not mixed in those message queues. This is schematically represented in FIG. 1 by showing different message queues 150 within different user data stores 110 (e.g., where first user data store 111 includes respective a first message queue 151A, a second message queue 151B, and a third message queue 151C, and where the second user data store 112 includes respective a first message queue 152A and a second message queue 152B).

In the example shown in FIG. 1, the various services 120 publish messages or events onto the message queues 150 representing events. For example, if service alpha 121 is a credit card or debit card charge service, then service alpha 121 may generate events reporting the status of charge requests made to the service (e.g., an event indicating that a charge has been accepted and is currently pending, an event indicating whether a corresponding charge was approved or denied, and an event generated when a charge has paid out to the user's balance on the platform). In some embodiments, each publisher may have a corresponding dedicated queue in each user data store that is connected to that publisher.

While a user may access data within their own data stores 110, a user is prevented from accessing data within the data stores 110 of other users (e.g., different organizations, customers) without permission from the other users, thereby improving the privacy and confidentiality of user data. A user may use the event data in its data store to perform various business functions, such as tracking the status of a payment from a customer to determine whether to ship goods to that customer.

As discussed above, the cloud-based software platform may host various applications 130 (or apps) that provide the users who use those applications with additional functionality. Furthermore, in some embodiments, the cloud-based software platform provides an externally-accessible application programming interface (API) to allow applications running on computer systems outside the cloud-based software platform 100 (e.g., on a third-party cloud computing platform, on a computer system in a private data center, or on a client computer system). Providing this functionality typically involves accessing the data stored in the user data stores 110. In the example shown in FIG. 1, App A 131 is connected to the user associated with the first user data store 111 and subscribes to events that are published onto the second message queue 151B and the third message queue 151C in the first user data store 111. App A 131 may then generate its own events (e.g., based on the events it receives from the second message queue 151B and the third message queue 151C) and publishes its own events onto a fourth message queue 151D in the first user data store 111. Similarly, FIG. 1 shows that App B 132, which is connected to the user associated with the second user data store, receives events from first message queue 152A and the second message queue 152B in the second user data store 112 and publishes events onto a third message queue 152C in the second user data store 112. In some cases, the same application may be connected to (e.g., installed by) multiple users (e.g., organizations, customers). For example, App A may also be used by the second user associated with the second user data store 112 and therefore App A might also subscribe to message queues stored in the second user data store 112 and write events to one or more other message queues in the second user data store 112.

In addition to reading events published to message queues 150 associated with user data stores 110 and writing events to message queues 150 in those user data stores, applications 130 may also read and write to static objects or records stored in the user data stores 110 using interfaces such as relational database interfaces (e.g., using a structure query language or SQL syntax), object storage databases, key-value stores, and the like.

In some embodiments, the message queues are associated with types of objects or records stored in the user data stores 110. For example, some types of data objects may relate to: Customers; Products; Prices; Transactions; Payments; and the like. Individual instances of these objects represent specific entries (e.g., a Customer object represents a single customer of the user, a Product may represent a single product offered by the user, and a Transaction may represent a purchase of one or more Products by a Customer). As events occur in relation to these different object types, new events may be added to the message queues associated with those objects. These may include change events relating to the data stored in the object type (e.g., changing contact information for a Customer or expiration of a saved payment method) and events that occur in relation to an object, such as receiving a payment made by a customer for their subscription to a product may generate an event on the Payment message queue.

In some embodiments, app developers and/or users (e.g., businesses) generate custom data types for customized to particular use cases, where data having the form of these custom data types can also be stored in the data stores 110 of the cloud-based software platform 100.

Some aspects of the present disclosure relate to an access controller 180 that mediates access to the data stored in the user data stores 110 of the cloud-based software platform 100 by the various services 120 and applications 130 that are also running on the cloud-based software platform 100 (and, in some embodiments, applications that are running on computing devices external to the cloud-based software platform 100), where access to data may be controlled by the owner of the data—for example, the message queues and data objects in the first user data store 111 is owned by the first user and therefore permissions of services and third-party applications to access to this data (e.g., read and/or write access) may be controlled by an administrator end-user account associated with the first user.

As noted above, data in the data stores 110 of the cloud-based software platform 100 may include data stored in the native data types provided by the services 120 of the cloud-based software platform 100 and data stored in the custom data types specified by users (e.g., software developers affiliated with the app developers and/or users). Some aspects of embodiments of the present disclosure relate to providing a data store API (or datastore API) that allows data structured in accordance with a custom data type (e.g., a custom schema) to be stored alongside native data types within a data store 110 of the cloud-based software platform 100. Each of these various native and custom data types may have one or more data fields that are specified by their corresponding schemas. For example, a given data type may include a plurality of different named fields, each representing primitive data types (e.g., Boolean values, numbers, and strings) and/or one or more aggregate data structures (e.g., arrays, lists, dictionaries, trees, or other objects). In some embodiments, the schema enables different third parties to structure data to enable the data to be communicated and exchanged through their apps.

The schema may specify constraints regarding the content of each of the fields in the data type. For example, two different schemas may both specify a timestamp field, but one schema may specify that the timestamp field is represented as the number of seconds since midnight on Jan. 1, 1970, whereas the other schema may specify that its timestamp field is represented as a string in accordance with the ISO 8601 standard. As another example, a field may be used to identify a category of an event, as identified using an integer or a string, where the schema specifies the allowed values representing different the different categories (e.g., for a transaction, 0 meaning inactive, 1 meaning pending, 2 meaning canceled, 3 meaning completed or the strings 'inactive', 'pending', 'canceled' or 'completed').

Some aspects of embodiments of the present disclosure relate to automatically determining a schema from a collection of unstructured data received from an organization or app developer. For example, a schema generator of the cloud-based software platform 100 may receive a data set of unstructured data from a user. The schema generator automatically parses the data set to identify fields of each entry in the data set that match frequently encountered types of data. These types of data may include, for example, dates or other timestamps, names, addresses, telephone numbers, email addresses, social security numbers, uniform resource locators (URLs) or universal resource identifiers (URIs), currency amounts, free-form narrative descriptions, type identifiers, and the like. Each of these patterns may be specified using, for example, a regular expression, a parser, or a trained statistical model (e.g., a language model configured to classify strings of input text) such that the various portions of the unstructured data are classified into different categories of data. Accordingly, the schema generator suggests a schema based on an automatic analysis of the unstructured data.

In the process of generating the schema, the schema generator may also note that some fields of the unstructured data relate to types of data that are subject to higher compliance requirements, such as compliance with legal or regulatory requirements or requirements imposed by agreements with other entities.

As such, some aspects of embodiments of the present disclosure relate to annotating fields of a schema to identifies fields of the data type that are subject to higher compliance requirements and therefore stored in the cloud-based software platform 100 in accordance with those higher compliance requirements (e.g., additional requirements due to legal regulatory requirements or requirements imposed by contractual agreements between parties). These annotations may be made manually by a user specifying the schema or may be set automatically by a schema generator according to embodiments of the present disclosure. In examples, a data object associated with a customer may include personally identifiable information (PII) such as Social Security Numbers (SSN), driver's license numbers, Alien Registration numbers, financial or medical records, biometrics, or a criminal history, where these types of information are subject to stricter handling guidelines to avoid or reduce liability in the case of a data breach. Other legal requirements, such as the General Data Protection Regulation (GDPR) may require certain entities to store and/or destroy personal data regarding European citizens, and/or transfer the data to another processing system. As another example, a data object associated with saved credit card or debit card information (e.g., a primary account number, card verification value (CVV), expiration date, and cardholder name) may be subject to security standards in accordance with the Payment Card Industry Data Security Standard (PCI DSS) to qualify for as a payment processor. As still another example, two parties may agree that particular types of information represent confidential business information and their agreement may specify additional requirements regarding safeguarding the information (e.g., encryption while stored at rest and while in transit, such as while being transferred over a network). These various regulations imposed by third parties, industry groups, and legal regulations create a complex mesh of compliance rules that may be difficult for entities to comply with.

Accordingly, in some aspects of the present disclosure, various fields that are annotated to indicate that the data stored in those fields are subject to additional compliance requirements are automatically stored in a manner that complies with those requirements. In some embodiments, PII data is stored in a higher-security tokenization data store 160, which associates each piece of PII data stored therein with a unique token. The unique token returned by the tokenization data store 160 is used to represent the personal data elsewhere in the cloud-based software platform, such as in the fields of events that are published to the message queues or in the fields of Customer records stored in the user data stores 110. The private data is later retrieved from the tokenization data store 160 using the unique token only when necessary (e.g., to be displayed to the user or exported to an authorized party). As another example, personal information associated with particular customers (or data subjects) in accordance with the GDPR may be stored separately from other data to more easily comply with a “right of erasure” provided by the GDPR. As another example, some data fields are encrypted, where access to the encryption keys are further controlled by the cloud-based software platform 100, which manages access to decrypting the data in accordance with authorized purposes.

Schemas generated by various parties, including the developers of the cloud-based software platform 100, app developers, and organizations, may be published to a schema catalog 170 such that those schemas are available for use by other users of the cloud-based software platform 100. The publication of these schemas improves coordination between different parties because agreeing to use a common schema enables different app developers to easily exchange information with one another. Adoption of various schemas by participants in the app marketplace provide for validation and enforcement of these developer defined schemas. For example, some schemas may become widely adopted in the marketplace, thereby validating the choices made by the designers of these schemas. In addition, some aspects of embodiments of the present disclosure relate to performing automated testing of implementations of schemas by apps to enforce correct implementation of these schemas by the apps. Publishing schemas in a schema catalog creates opportunities for developing open standards (e.g., which may be set by an open working group of interested parties such as organizations making use of these schemas for data interchange) and for providing easy integration apps. In addition, schemas may be stored alongside their corresponding apps (e.g., for use by the app in reading and/or writing data in accordance with those schemas), stored in the user data store 110 (e.g., for validating that data written to the user data store is compliant with the schema), stored in a data store associated with an app (e.g., an app data store within the cloud-based software platform), and/or may be stored in association with the organization publishing the schema to the schema catalog 170 (e.g., to ensure that the organization retains control over the content of the data schema).

For example, a user may install an accounting app on the cloud-based software platform 100 (e.g., grant the accounting app access to its data), where the accounting app reads transactions completed through the course of business and that maintains information based on those transactions (e.g., revenue, costs of goods sold, sales taxes collected and for which tax jurisdictions, and the like). As the term is used herein, when a user installs an app on the cloud-based software platform 100, the installation process does not require the copying of executable code onto a storage device associated with the user as would be expected in the installation of an application on a personal computer or personal smartphone, but, instead, is intended to refer to connecting the app to the user’s account on the cloud-based software platform, such that the app can access data stored in the user’s data store 110. An app developer may also require the user to purchase a license to the app before it can be installed, such as purchasing a subscription, where the user makes periodic payments to the app developer to install the app and for the app to continue functioning for the user’s account.

Different payment processing services (e.g., payment processing provided by services 110 of the cloud-based software platform, third-party online payment processing services such as PayPal® or Zelle®, and the like) may internally use different internal representations for transactions, which may make it difficult to integrate these various payment processing services with the accounting app. As another example, a fulfillment app may also consume transaction events to track inventory levels, report on the order processing and shipping status of the goods sold, and the like. However, a published public schema for transactions provides a potential point of coordination between payment processing services, such that all such payment processing services can generate events representing transactions in accordance with a common schema (e.g., adopted through explicit coordination or through de facto adoption of a schema by the parties).

Accordingly, various users of the cloud-based software platform 100 may publish schemas to the schema catalog 170, and various apps running on the cloud-based software platform 100 may adopt these schemas and indicate their compatibility with these various schemas, such that users can identify combinations of apps (e.g., accounting apps, inventory apps, and payment processing apps) that will automatically work together, thereby reducing the amount of manual work needed to convert data between different schemas to integrate the various apps. For example, apps 130 that are available for use or installation by users of the cloud-based software platform 100 may be published in an app marketplace or app store or app catalog 190, where entries in the app catalog 190 specify which schemas they are compatible with, and may also show whether a given app is compatible with apps that are already installed on (or connected to) a client account (e.g., an administrator user associated with the client account may use an end-user interface for an app store or app catalog or app marketplace, which may be implemented in a web browser, to view available apps and can filter apps or otherwise see the compatibility of the app with other apps that are already connected to the client account, based on whether those apps are compatible with given data schemas).

Some aspects of the present disclosure further relate to a query language that allows for computations on the data stored based on fields that are accessible as identified by the schema. For example, apps and users may use a query language (e.g., a structured query language or SQL or other data query protocol), such that records matching particular conditions (e.g., transactions having a dollar value above a specified amount, events occurring within a specified date range, or customers matching particular criteria) are retrieved from the data store. In some embodiments, the query language further enables computing aggregate data (e.g., averages or statistics based on the stored data, such as binning of customers by geographical parameters such as postal code) and/or anonymized data (e.g., here individually identifiable data are removed). Executing these queries at the data store reduces data transfer (e.g., because the computations are performed near where the data is stored in the data stores 110) and also enables increased security and privacy (e.g., because PII data need not leave the cloud-based software platform 100, thereby allowing computations to be performed on the PII data, where the aggregated results are returned to the party issuing the query).

As noted above, some aspects of the present disclosure relate to an access controller 180 that mediates or controls access to the data stored in the user data stores 110 of the cloud-based software platform 100 by the various services 120 and applications 130 that are also running on the cloud-based software platform 100 (and, in some embodiments, applications 130 that are running on computer systems outside of the cloud-based software platform 100). In some embodiments, the access controller 180 maintains a data store of permissions granted between pairs of interacting parties. One such example is a set of permissions granted by a user for an app 130 to access to specific data stored in a user data store 110 corresponding to that user. Referring to the example shown in FIG. 1, a first user may have granted App A 131 with permission to read from the second message queue 151B and the third message queue 151C of its first user data store 111 along with permission to write to (e.g., publish events to) the fourth message queue 151D. Accordingly, in some embodiments, the access controller 180 verifies that App A 131 has permission to read a particular message queue as a precondition to providing events from that message queue to App A 131 from such a message queue and, likewise, verifies that App A has permission to write to a given message queue as a precondition to allowing App A to publish an event to that given message queue.

Therefore, some aspects of the present disclosure relate to a process flow for a user to grant an app with permission to access data stored in the user's data store.

When an end-user (e.g., an administrator user) of the user account installs an app on the cloud-based software platform (e.g., connects the app to the user account), the app may request access to particular types of data that are stored in the user data store 110. In some embodiments, after initiating an installation process (e.g., by clicking on an "install" or "buy" button), a permissions request user interface displays the permissions requested by the app, and the administrator user may then grant or deny the request for permissions to access the specified types of data that are stored in the user data store 110. The levels of permission to access the specified types of data may include read-only permission (R), write-only permission (W) (or append-only permission in the case of a message queue), and read-write permission (RW), where the app may request different levels of permission for different data types (e.g., read-only permission may be sufficient for the app 130 when working with some types of data, and the app may need to write only to some particular types of objects in the user data store 110).

In some embodiments, a manifest (e.g., stored in a file) specifies a collection of data types used by the app 130 to provide its functionality, where the manifest is associated with a given version of the app 130 that is deployed to the cloud-based software platform 100. Accordingly, the access controller 180 may present the data types specified in the manifest to the administrator user through the permissions request user interface, such as by listing the data types stored in the data store 110 that the app 130 is requesting permission to access. In some embodiments, the permissions request user interface further includes descriptions from the app developer (e.g., specified in the manifest) that explain why the app 130 is requesting access to particular data and what the app 130 will do with each type of data (e.g., "This app will use Transaction records to track revenue and costs associated with different product lines" and "This app requests access to Customer data to store additional information in association with your Customers for managing your relationships with those customers and for performing customer segmentation and targeting"). In some embodiments, the permissions request user interface further includes examples of the data being requested by the app, either as a general example or specific examples taken selected from the user data store 110. When an administrator user of a user (e.g., of an organization user account) grants (or denies) an application 130 permission to access the requested data types stored in its data store 110 (e.g., via response provided through the permissions request user interface), the access controller 180 stores the permission grant information in a permission grants data store 181.

In some embodiments, an individual record in the permission grants data store 181 represents a pairing of an application 130 and a user data store 110 (e.g., App A 131 and first user data store 111) and stores the permissions that have granted to the application 130 by the user associated with the corresponding user data store 110.

Figure 2A:
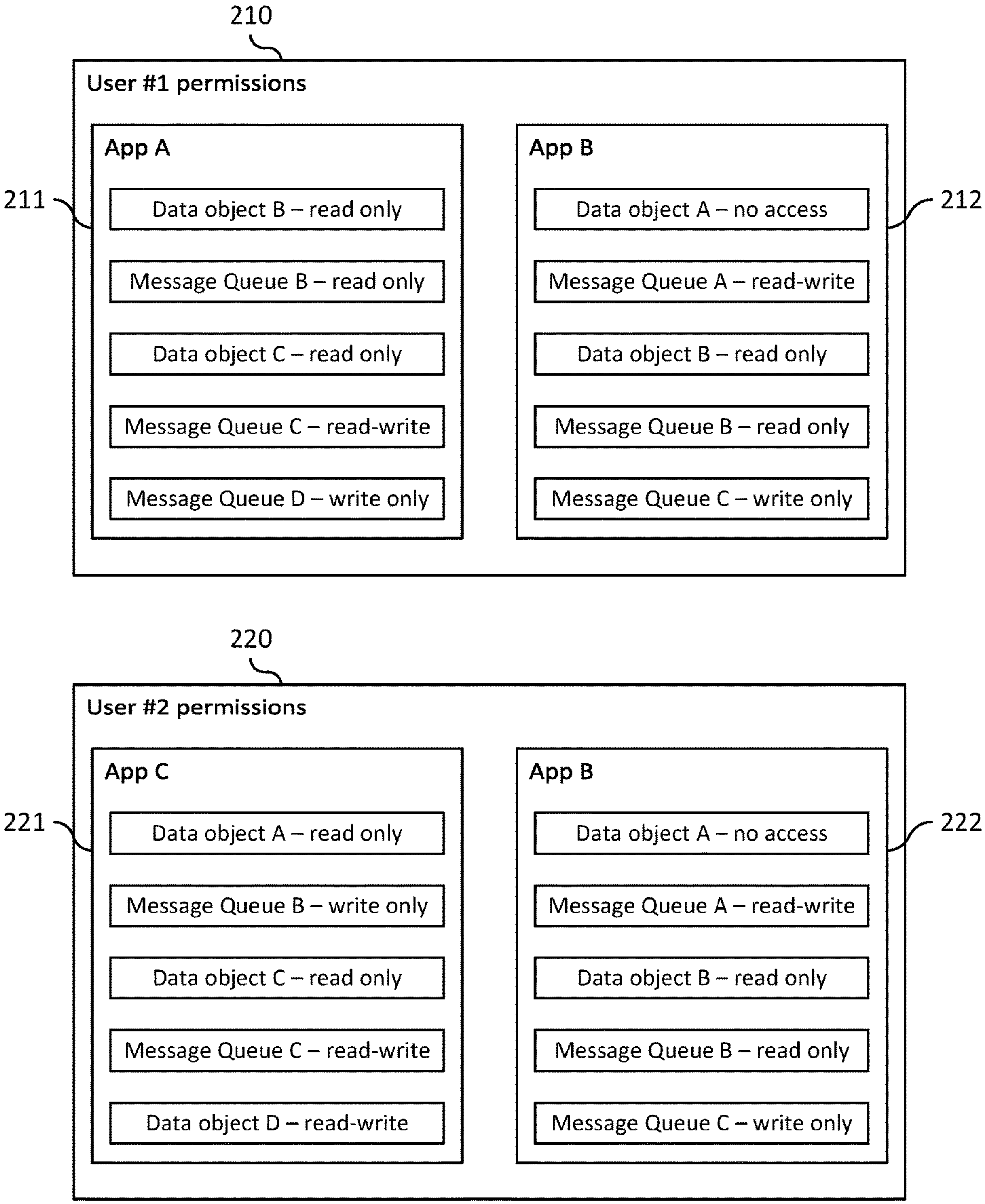
FIG. 2A is a graphical depiction of the scoping of permissions for two different applications connected to a same user account according to one example of the present disclosure.

FIG. 2A is a graphical depiction of the scoping of permissions for different applications connected to different user accounts according to one example of the present disclosure. As shown in FIG. 2, a first user may be associated with a set of permissions 210, where those permissions include separate sets of permissions granted to different apps, such as a first set of permissions 211 granted to App A and a second set of permissions 212 granted to App B. Likewise, a second user may be associated with a set of permissions 220, where those permissions include a first set of permissions 221 granted to App C and a second set of permissions 222 granted to App B.

Figure 2B:
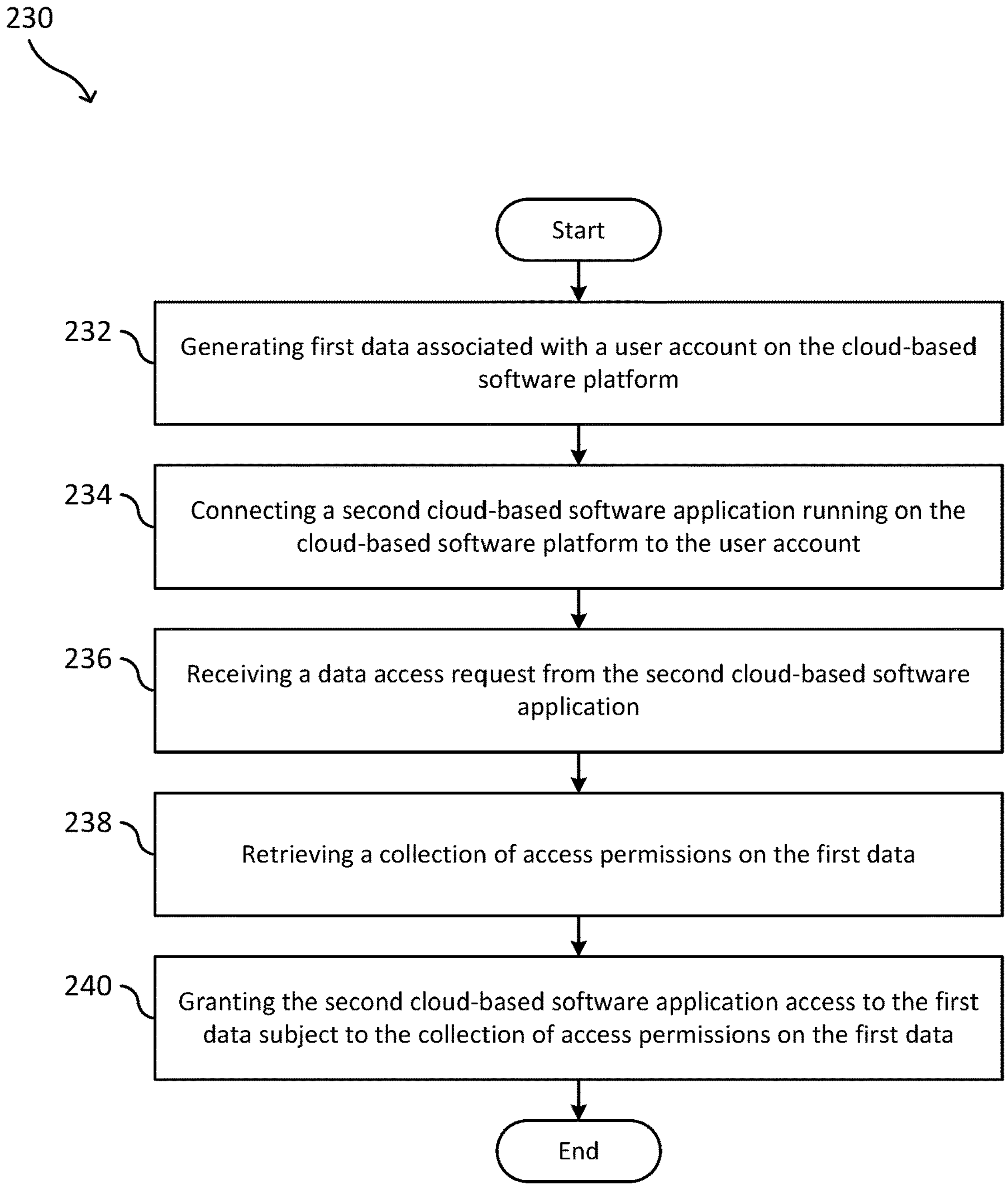
FIG. 2B is a flowchart that describes a method for managing access to data in a cloud-based software platform, according to some embodiments of the present disclosure.

FIG. 2B is a flowchart that describes a method 230 for managing access to data in a cloud-based software platform, according to some embodiments of the present disclosure. In some embodiments, at 232, the method may include generating, by a first cloud-based software application running on the cloud-based software platform, first data associated with a user account on the cloud-based software platform 100. Herein, the cloud-based software application generating the first data associated with the user account may be a service 120 running on the cloud-based software platform 100 or a first-party or third-party application 130 running on the cloud-based software platform 100 or a third-party application 130 running on a computing device outside of the cloud-based software platform 100.

At 234, the method may include connecting a second cloud-based software application running on the cloud-based software platform to the user account, such as when an administrator user associated with the user account initiates an installation process for the second cloud-based software application. As noted above, when connecting the second cloud-based software application to the user account, the second cloud-based software application 130 may request permission to access data stored in the user data store 110 in accordance with various data types, where the level of permission (e.g., read-only, write-only, read and write) may be specified in a manifest associated with the second cloud-based software application.

In some embodiments, the collection of access permissions may be defined by the first cloud-based software application as part of the schema or schemas specifying the data types stored by the first cloud-based software application. For example, the app developer who created the first cloud-based software application may define some fields of the data types as being private (e.g., not accessible to third-party apps), may define some fields to be read-only (e.g., because modifying those fields would interfere with the operation of the first cloud-based software application), and may define some fields to be write-only or append-only or read-write, based on the expectations of the application regarding the data stored in those fields. Accordingly, an administrator user can only grant permissions on data generated by the first application to the degree that is allowed by the first application.

When an administrator user grants these permissions to the second application, the access controller 180 stores a record of the granting of the permissions in the permissions store 181. In some embodiments, in circumstances the administrator user denies the request for permission to access the specified data stored in the client data store 110, the installation of the app is aborted and the app is not connected to the user account. In some embodiments, the administrator user may grant a partial set of permissions, and the app may subsequently operate in a manner consistent with the reduced access to the data stored in the client data store 110.

At 236, the method may include receiving a data access request from the second cloud-based software application, the data access request requesting the first data generated by the first cloud-based software application. The data request may involve for example, accessing first data stored in a data object in the data store (e.g., a Transaction record or a Customer record) or may relate to first data corresponding to an event published to a message queue as part of an event stream (e.g., where the app is a subscriber to a particular message queue and a new event is published to the message queue).

At 238, the access controller retrieves from the permissions store 181 a collection of access permissions on the first data generated by the first cloud-based software application controlling access to the first data by the second cloud-based software application. At 240, the access controller grants the second cloud-based software application with access to the first data subject to the collection of access permissions retrieved from the permissions store 181. In some embodiments, accessing data in the data store, such as a particular event stream, includes computing the intersection between the permissions granted to the application by the user (as stored in the permissions store 181) and the data requested by the application 130, where this intersection is what is received by the requesting application 130.

In some embodiments, a secondary platform on the cloud-based software platform integrates the first cloud-based software application and the second cloud-based software application and manages a plurality of user accounts on the cloud-based software platform. The user account delegates control of the collection of access permissions associated with the first data to the secondary platform.

In some embodiments, the secondary platform may be configured to display, to an authorized user of the user account, a request to set the collection of access permissions associated with the first data. In some embodiments, the first data schema may be published in a repository comprising a plurality of data schemas accessible to cloud-based applications running on the cloud-based software platform.

In some embodiments of the present disclosure, the administrator user grants access to the data stored in the data store 110 on a schema basis, rather than an app basis. Accordingly, instead of granting a particular app with access to particular data, the administrator end-user may grant all installed apps (apps connected to the user account) with the same access permissions for all data in the data store that is consistent with one or more specified schemas. Continuing the previous example of an accounting app, the user may specify that the accounting app can access all data stored in the data store 110 that has the Transaction data type (e.g., and any message queues associated therewith) such that the accounting app has access to all Transactions, no matter which payment processing app generated those Transactions. A schema-based approach to granting access permissions also allows the accounting app to access Transactions generated and stored in the user data store by payment processing apps that are connected to the user account after the administrator user initially granted those permissions to the accounting app. As noted above, the schema itself may specify which fields can be shared with other apps, in addition to the level of access (e.g., read, write, append, read-write, and the like) available on these schemas.

In some circumstances, app developers may update their apps 130 to provide additional functionality and/or to fix bugs in those apps 130. These updated, new versions of apps may require permission to access additional data types or to obtain higher level permissions (e.g., read-write access instead of merely read-only access) than a previous version of the app. Accordingly, some aspects of the present disclosure relate to updating access permissions. For example, a user interface may prompt an administrator end-user that the application is requesting additional permissions to access data in the data store 110.

Figure 2C:
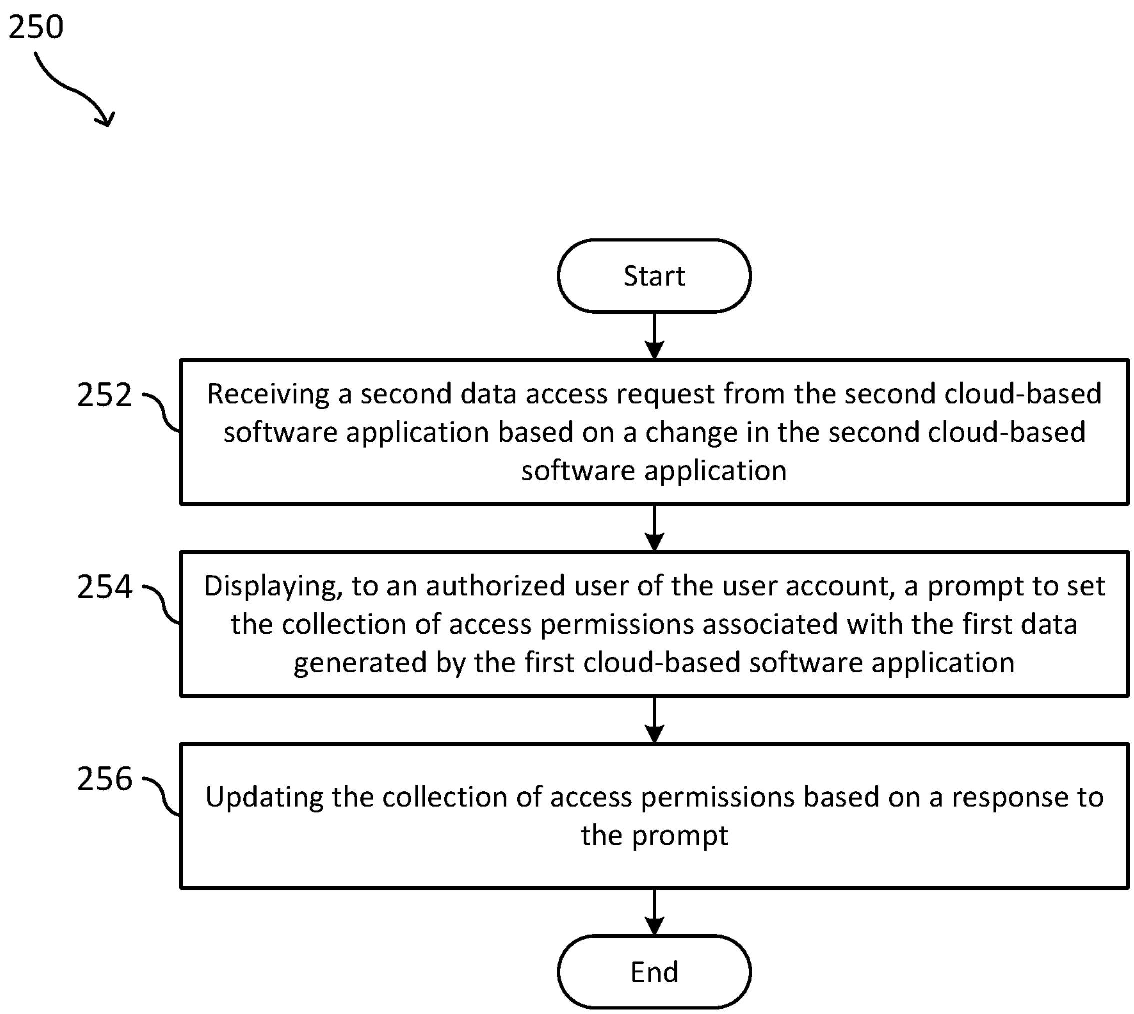
FIG. 2C is a flowchart that describes a method for updating access permissions according to some embodiments of the present disclosure.

FIG. 2C is a flowchart that describes a method 250 for updating access permissions according to some embodiments of the present disclosure. In some embodiments, at 252, the method may include receiving a second data access request from the second cloud-based software application based on a change in the second cloud-based software application. At 254, the method may include displaying, to an authorized user of the user account, a prompt to set the collection of access permissions associated with the first data generated by the first cloud-based software application to control access to the first data by the updated second cloud-based software application. At 256, the method may include updating the collection of access permissions based on a response to the prompt. Accordingly, the administrator end-user can grant additional permissions to the application when required by updated functionality in an updated version of the software. In some embodiments, the access controller 180 does not allow the application to access additional data stored in the data store 110 associated with a connected user until the user has granted those additional permissions associated with the new version. Accordingly, the app developer may take the reduced access into account when developing their application, such as by provided degraded behavior (e.g., behavior in accordance with an older version of the app) until the user explicitly grants permission to access the additional data.

Some aspects of the present disclosure relate to further limiting access to data based on an end-user account associated with a user (e.g., an organization client) of the cloud-based software platform 100. An organization client may be, for example, a business, where different employees of the business have different roles, such as managers, customer service representatives, sales representatives, accountants, and the like. These employees may interact with the data stored in the user data store 110 associated with their employer (the user of the cloud-based software platform 100) through different end-user accounts on the cloud-based software platform. Because different users have different needs in terms of access to the data stored in the user data store 110 and because their roles may indicate different levels of trust between the organization and the individual employees, the access controller 180 may further mediate the level of access that individual end-user accounts have to the data stored in the user data store 110.

For example, end-user accounts associated with one user typically are not granted access to data stored in a data store associated with another user (e.g., another business), without explicit coordination or permission from the other user.

In some embodiments of the present disclosure, end-users access the cloud-based software platform 100 through a user interface provided by client software. The client software may be implemented, for example, as a web interface through a web browser. For the sake of illustration, a user interface will be discussed herein in the context of a dashboard containing various application components, where different application components serve as a front-end user interface to various services 120 and apps 130 (including, e.g., third-party apps installed from an app store or app catalog or app marketplace) connected to the user account, although embodiments of the present disclosure are not limited to dashboards as the end-user interfaces. These application components or other user interface components associated with specific apps display information on the user interface to the cloud-based computing platform (e.g., the dashboard) and may also provide functionality for providing user inputs (e.g., buttons, text fields, sliders, clickable images, and the like, such as may be implemented in a web browser interface). These application components may display information in accordance with read permissions associated with the application component (e.g., the permissions associated with the app that the application component communicates with or is a component of) and the application components may modify information in the user date store 110 in accordance with permissions associated therewith. In some embodiments, these permissions are further constrained by the user role of the end-user accessing the user interface for the cloud-based software platform, as discussed in more detail below.

In some embodiments of the present disclosure, each end-user account is associated with a corresponding role representing the responsibilities associated with the end-user. As noted above, these may include customer service representatives, salespeople, accountants, and managers. To mediate the level of access available to these end-user accounts, the permission grants data store 181 may further store information regarding permissions granted to each end-user role or each individual end-user account. In some embodiments, an administrator end-user may manually specify which data objects and which fields each end-user role or each end-user has access to.

In some embodiments, the level of access that can be granted to an end-user to various fields of a data type is constrained by the schema defining the data type (e.g., as set by the creator of the schema).

For example, a customer service representative role may be granted access to past orders and transactions by a particular customer who they are interacting with during a customer service interaction but may not be granted direct access to data objects associated with making charges or issuing refunds. Instead, access to issuing refunds may be limited to supervisors, such that the customer service representative requests authorization from their supervisor to perform the refund, and where the supervisor may issue the refund though their separate end-user account (having a supervisor role). As another example, access to data that is not available directly to an end-user account may nevertheless be made available through a specialized user interface that enforces a particular workflow to ensure that corresponding business rules are complied with. For example, a refund process may require that a corresponding subscription be canceled or that the monetary value of the refund be smaller than a threshold value.

In some embodiments, apps 130 may define various end-user roles and corresponding default permissions associated with data types that are stored by the app into the client data store 110. Accordingly, the process of installing an app may include associating the end-user roles defined by the app with the end-user roles defined at the user organization level (e.g., matching a "customer service representative" role defined in the app with both a "chat support" role defined at the user organization and a "telephone support" role defined at the user organization), such that appropriate access permissions are set on the end-user accounts of the user organization.

Figure 3:
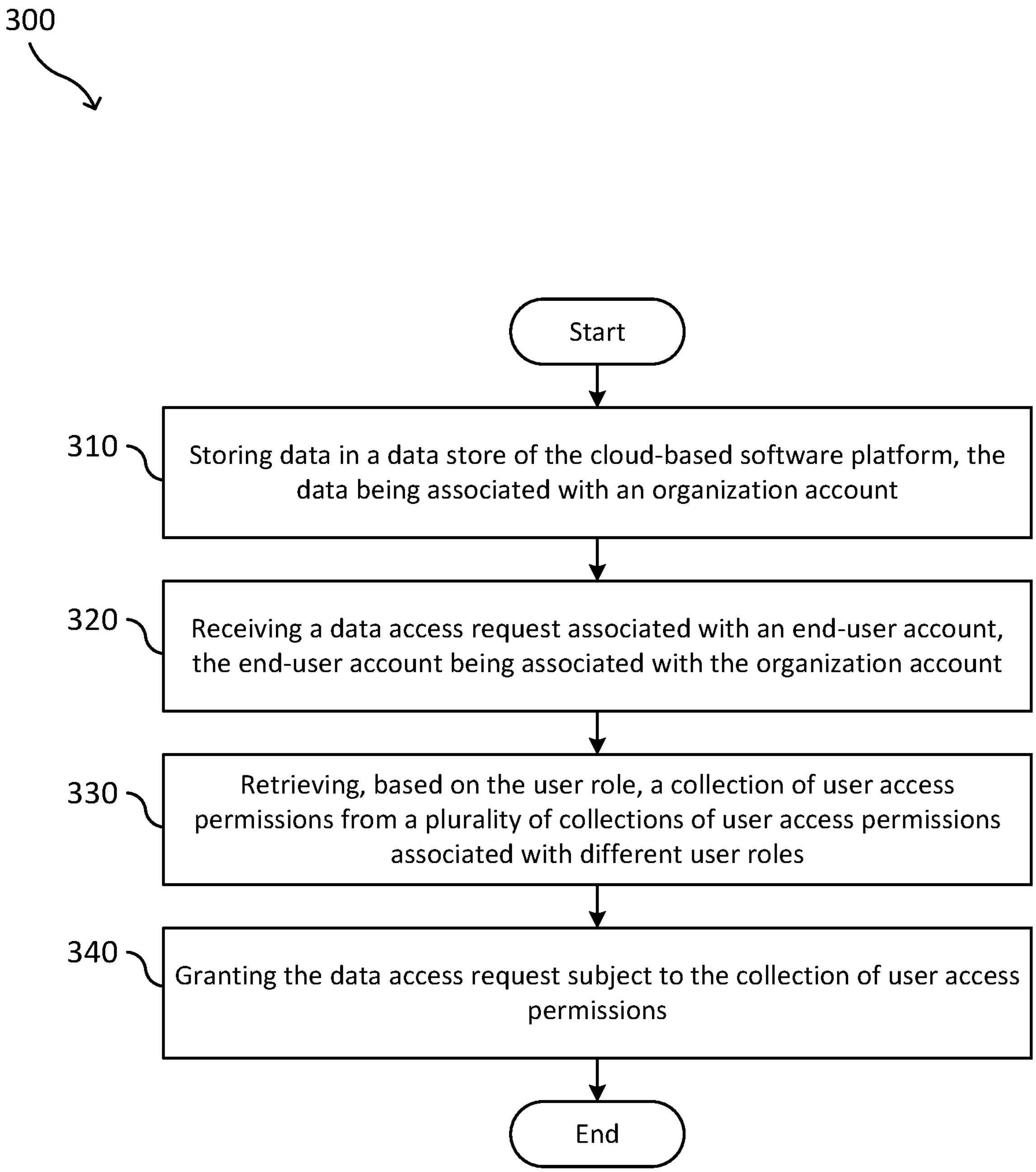
FIG. 3 is a flowchart that describes a method for managing access to data in a cloud-based software platform, according to some embodiments of the present disclosure.

FIG. 3 is a flowchart that describes a method for managing access to data in a cloud-based software platform, according to some embodiments of the present disclosure. In some embodiments, at 310, the method may include storing data in a data store of the cloud-based software platform, the data being associated with an organization account. At 320, the method may include receiving a data access request associated with an end-user account, the end-user account being associated with the organization account and having a user role among a plurality of user roles. This data access request may be generated based on a request for data to populate a user interface accessed by the end-user account.

At 330, the method may include retrieving, based on the user role, a collection of user access permissions from a plurality of collections of user access permissions associated with different user roles (e.g., stored in the permissions store 181). The collections of user access permissions may be defined by a schema associated with the data. At 340, the method may include granting the data access request subject to the collection of user access permissions. In some embodiments, the granting the data access request subject to the user access permissions may include filtering the data in accordance with the collection of user access permissions associated with the user role, such that the user receives only the portions of the data that satisfy conditions specified by the user access permissions associated with the user role of the user. The user access permissions may specify that other portions of the data are inaccessible to particular user roles and therefore the granting of the access request would not grant access to these other portions of the data (e.g., the filter blocks access to portions of the data that the user access permissions indicate are not accessible to the associated user role).

Different applications may specify different access permissions for data associated with those applications and stored in the user data store 110. As such, the permissions grant data store 181 may store different collections of permissions for different user interface elements associated with these different applications for each of the different end-user roles, and where the end-user interface provides access to data from the user data store 110 in accordance with these per-app constraints (e.g., including read-only versus read-write access).

As noted above, some aspects of the present disclosure relate to sharing of data between multiple applications 130 that are connected to a same user account, where the data may be shared in the user's data store 110. Published schemas that define the structure or shape of data stored in accordance with various data types allow the different applications 130 to coordinate the reading and writing of these data, as well as expectations about the data stored in the fields of those data types (e.g., formats of individual fields and whether various fields may be modified by other applications). Some examples include apps that process transactions (e.g., payment processing apps) that publish Transaction events that are read by an accounting app to maintain accounting records regarding those transaction and which may also be read by a fulfillment app to track and implement the process of fulfilling the orders placed by customers to thereby complete the transactions.

Figure 4:
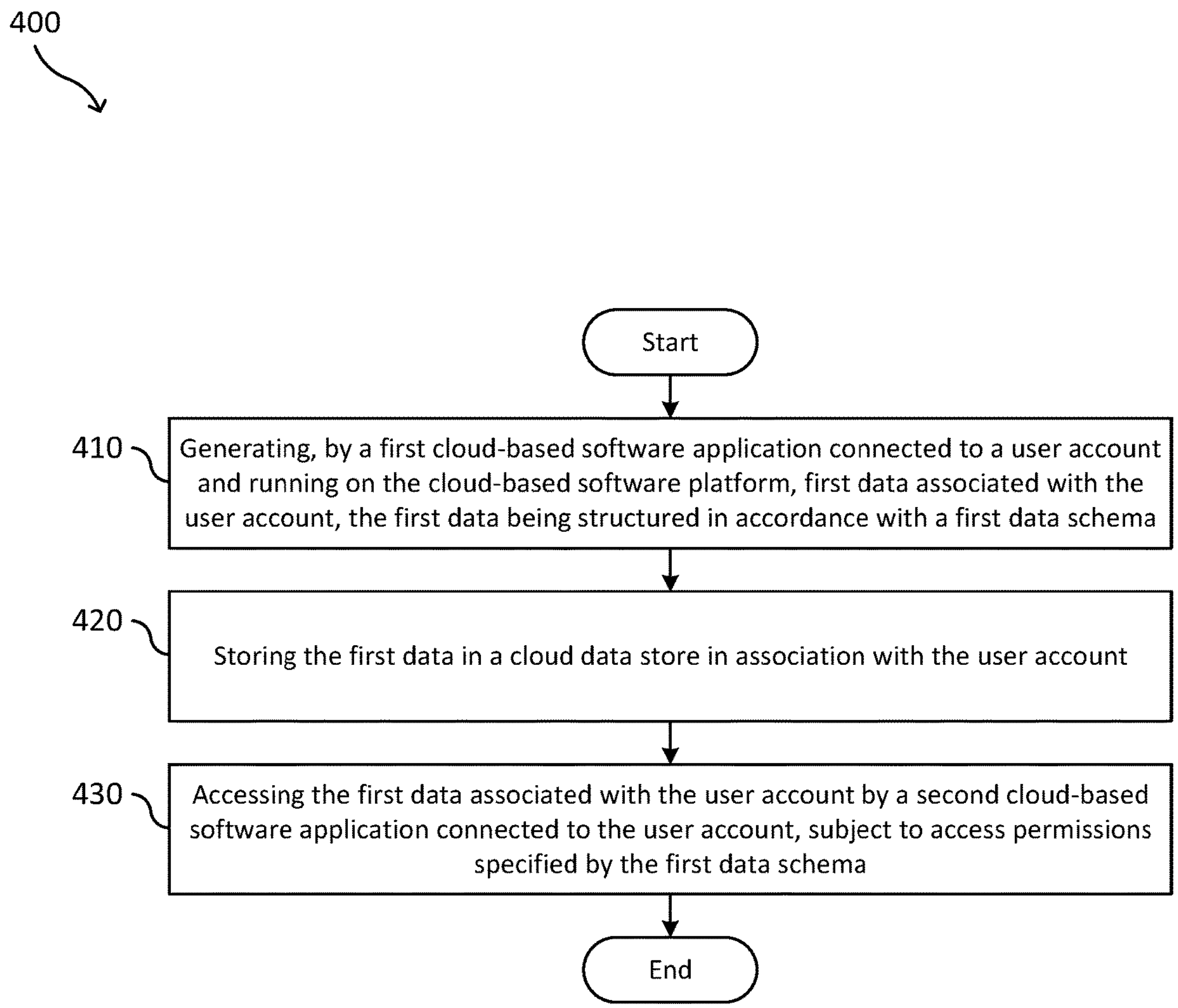
FIG. 4 is a flowchart that describes a method for providing access to data in a cloud-based software platform, including the exchange of data between multiple applications, where the data is structured in accordance with a schema according to some embodiments of the present disclosure.

FIG. 4 is a flowchart that describes a method for providing access to data in a cloud-based software platform, including the exchange of data between multiple applications, where the data is structured in accordance with a schema according to some embodiments of the present disclosure. In some embodiments, at 410, the method may include generating, by a first cloud-based software application connected to a user account and running on the cloud-based software platform, first data associated with the user account, the first data being structured in accordance with a first data schema. As a concrete example, the first data schema may be a schema representing a transaction between two parties.

At 420, the method may include storing the first data in a cloud data store in association with the user account (e.g., in the user data store 110). At 430, the method may include accessing the first data associated with the user account by a second cloud-based software application connected to the user account and running on the cloud-based software platform, subject to access permissions specified by the first data schema, where the access permissions are enforced by an access controller 180 according to embodiments of the present disclosure. In some embodiments, the first data stored in the cloud data store in association with the user account may be inaccessible to a second instance of the second cloud-based software application connected to a second user account different from the user account.

In some embodiments, an app can request access to all data in a user data store 110 that matches one or more specified schemas and, assuming that permission to access such data is granted by the owner of the user data store 110, all such data matching those one or more specified schemas are retrieved and provided to the app as appropriate (e.g., automatically pushed to the app as events are published onto the message queues corresponding to those data, and/or provided in response to queries submitted by the app against a user data store 110).

As noted above, multiple apps may generate data in accordance with the same data schema, such that, for example, second data structured in accordance with the first data schema may be generated by a third cloud-based software application connected to the user account and running on the cloud-based software platform or running on a computing device outside of the cloud-based software platform (e.g., in a third-party cloud-computing environment, third-party data center, or end-user client device). This second data matching the same first data schema may also be stored in the user data store 110, such that the second app can also receive the data generated by the third app. In addition, because the permissions are granted on a per-user basis, the second app cannot access data matching the first schema that is stored in other user data stores 110 whose owners have not granted the second app with permission to access these data (e.g., who have not installed or connected another instance of the second app on their corresponding user accounts).

Cloud-based apps may also generate additional data based on data generated by other apps. For example, a fulfillment app may take in transaction data and generate data relating to order status and inventory. The data generated by the fulfilment app may then be stored in the user data store 110 of the connected user account, and these data may be further read by other apps (e.g., a supplier management app configured to place orders for additional inventory when the amount of stock in inventory runs low).

Figure 5:
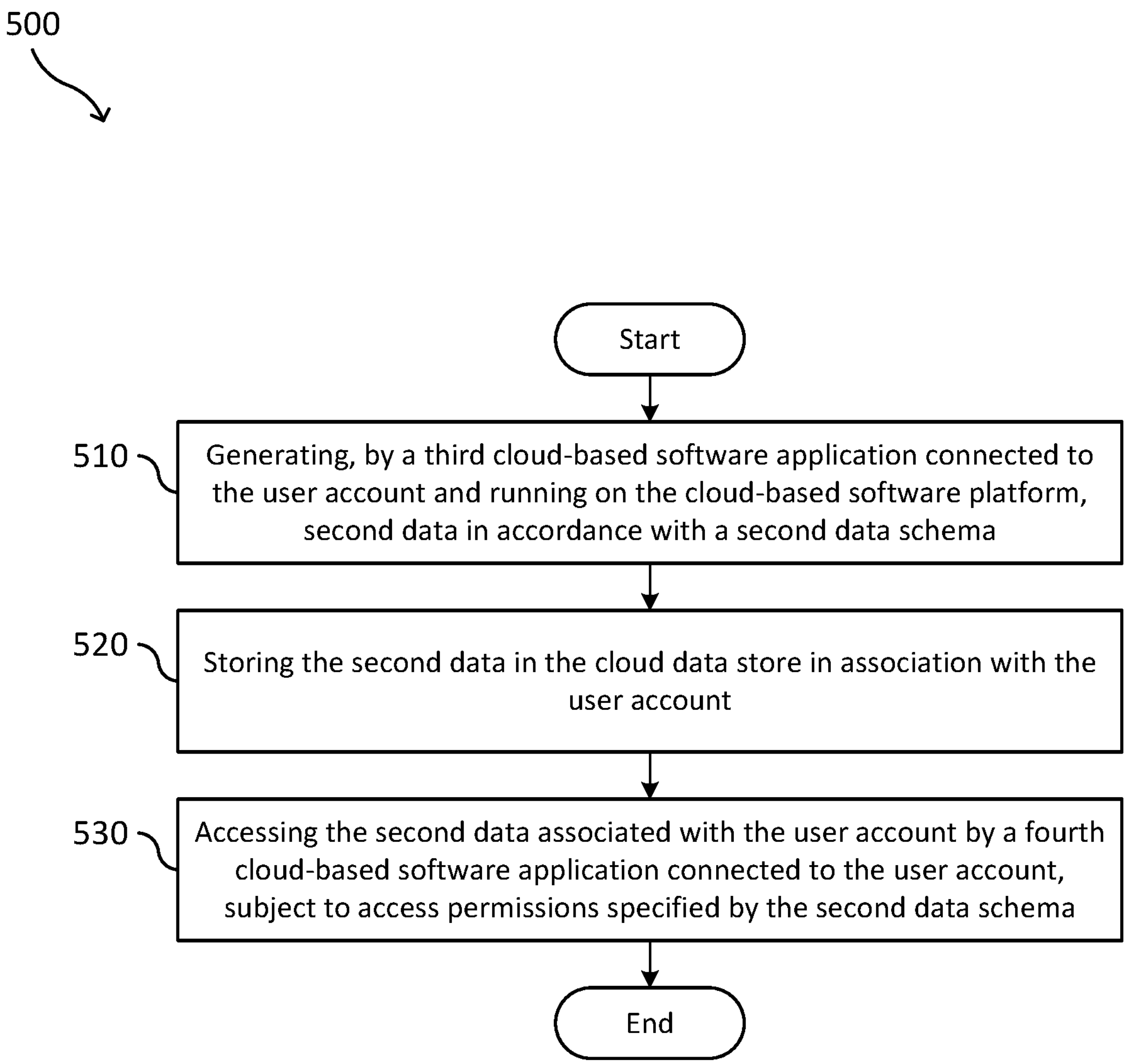
FIG. 5 is a flowchart that further describes the method for sharing access to downstream data by apps on a cloud-based software platform, according to some embodiments of the present disclosure.

FIG. 5 is a flowchart that further describes the method for sharing access to downstream data by apps on a cloud-based software platform, according to some embodiments of the present disclosure. In some embodiments, at 510, the method may include generating, by a third cloud-based software application connected to the user account and running on the cloud-based software platform (or, in some embodiments, running on a computing device outside of the cloud-based software platform), second data associated with the user account, the second data being structured in accordance with a second data schema different from the first data schema. At 520, the method may include storing the second data in the cloud data store in association with the user account. In some embodiments, at 530, the method may include accessing the second data associated with the user account by a fourth cloud-based software application connected to the user account and running on the cloud-based software platform, subject to access permissions specified by the second data schema. For example, by controlling the access permissions to the data at the level of the data schema, rather than at the level of the user, app developers can rely on which fields will be accessible for reading, which fields can be written to, and which may be volatile (e.g., changed by other apps).

As noted above, some aspects of embodiments of the present disclosure relate to accessing data stored in the user data stores using a query language. Queries may be supplied to the user data stores 110 by apps 130 (e.g., running on the cloud-based software platform 100 or on a computing device outside of the cloud-based software platform) and other interfaces (e.g., an end-user interface, which may be implemented as an app 130 running on the cloud-based software platform and/or which may use separate client software). In such cases, the access controller 180 performs the same permissions analysis as discussed above to determine whether the party issuing queries on a user data store 110 has been granted permission to access the data types that would be read from or written to by these queries, where those permissions are stored in the permissions store 181 as discussed above.

Some aspects of embodiments of the present disclosure relate to organizational users in which access controls are organized into multiple levels of a hierarchy.

For example, in some embodiments, an organizational user may be compartmentalized into multiple compartments under an overarching organization, and where each compartment may, in turn, include sub-compartments. One example is a global organization that operates in multiple different jurisdictions (e.g., different countries or regions). As such, the organization may operate different branches or subsidiaries such as for the North American market, the East Asian market, and the African market, and where each of these branches may have separate sub-branches (e.g., a branch for the European market may have separate sub-branches for the United Kingdom and for Germany).

Each of these branches of the organization may operate in a different compartment within the organization account. While the overarching organization may have permission to access to data stored in its data store (or data stores) for any of its compartments, apps may be constrained to accessing data only associated with authorized compartments. For example, a fulfillment provider specializing in last-mile deliveries in Japan may be constrained to only the data stored in the data store that is associated the Japan sub-compartment of the overall organization account, because data corresponding to other countries is not pertinent to its providing of services.

As such, some embodiments of the present disclosure relate to installing an app at the organization level, where access permissions are specified at the compartment or sub-compartment level (e.g., granting access only to the United States and Canada compartments, but not the Germany compartment). In some embodiments, the access controller 180 presents the compartment-level access options to an administrator end-user of the organization account in a permissions grant user interface that lists the available compartments, such that the administrator end-user can select (e.g., using checkboxes) which compartments, or sub-compartments, are to be granted access to the requested data.

In addition, as noted above, some users may operate as a secondary platform, which may provide some custom solutions in the form of their own apps, and which may also integrate with other apps on the cloud-based software platform, to provide its clients with a bundle of services. Referring back to an example presented above, a pizzeria support service may provide website templates and payment processing services (constructed from the services provided by the cloud-based software platform) that are tailored for the types of transactions commonly encountered by local restaurant (e.g., handling a highly customizable menu of goods to be sold, processing refunds of small transactions, handling a mix of payment types, payment of delivery drivers such as tipping, payment of vendors and suppliers, and the like). The cloud-based software platform 100 may store data on behalf of its user (the pizzeria support service) which, in turn, receives data entrusted to it by its connected accounts or clients (the individual pizzerias).

In some embodiments of the present disclosure, the connected accounts have user accounts on the cloud-based software platform 100 and, accordingly, may have separate data stores 110 storing data associated with those accounts. The connected accounts grant the secondary platform access to their corresponding user data store 110. However, third-party apps that are integrated by the secondary platform may also need to access data stored in the user data store 110 of the connected accounts (e.g., read and/or write data to the user data store 110).

Therefore, in some embodiments of the present disclosure, when connecting a secondary platform to a connected account, the access controller 180 requests that the connected account give data access permissions to all the apps that are integrated into the secondary platform. For example, a permissions grant user interface may show all the data types that will be accessed by the secondary platform and the apps integrated therewith, such that the administrator end-user of the connected account can review and evaluate these permissions requests. In a manner like that described above, in a circumstance where an app is upgraded to a new version that requires one or more additional permissions, an administrator user of the connected account may be presented with a permissions grant user interface showing the additional requested permissions and receive a grant of those additional permissions.

In some embodiments, to reduce the administrative burden on the connected account, the connected account may authorize the secondary platform to manage the permissions on data stored in the user data store on its behalf. This may be especially beneficial when the end-users of the connected accounts do not need to know the details of the operation of the secondary platform, and where all data stored in the user data store 110 is generated through the interactions with the secondary platform. Accordingly, the secondary platform may use its authorization from the connected account to grant integrated third-party apps with access to the data stored in the user data store.

In a manner like that described above, connected accounts may similarly have a number of different end-user roles (such as a manager role, an accountant role, a cashier role, an inventory role, and the like) where these different end-user roles may have different needs with respect to the data stored in the user data store. Accordingly, in a manner like that described above, these end-user accounts may have corresponding levels of access to the data stored in the user data store, as restricted based on the permissions specified in the data schemas and/or set by the apps and the secondary platform.

Accordingly, aspects of the present disclosure relate to systems and methods for controlling access to data stored in a cloud-based software platform. In some embodiments, an access controller mediates access to data stored in the user data stores, based on whether the owners of the data have granted permission to the party attempting to access this data. These access permissions may be further constrained based on the end-user account attempting to access the data. Furthermore, the data access permissions may also be applied to the exchange of data between different apps running on the cloud-based software platform.

Figure 6:
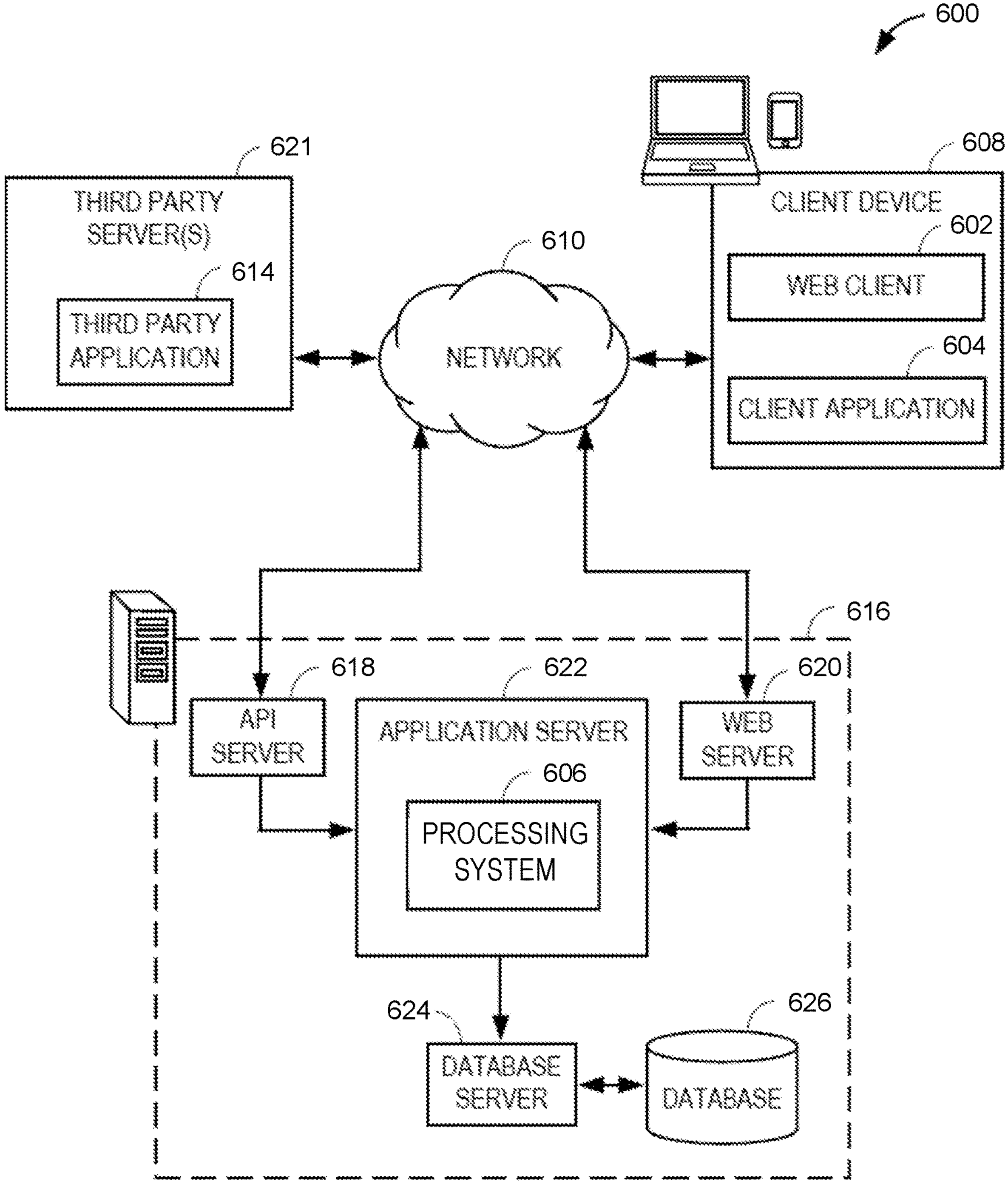
FIG. 6 is a block diagram illustrating a high-level network architecture of a computing system environment for operating a processing system according to embodiments of the present disclosure.

With reference to FIG. 6, an example embodiment of a high-level SaaS network architecture 600 is shown. A networked system 616 provides server-side functionality via a network 610 (e.g., the Internet or a WAN) to a client device 608. A web client 602 and a programmatic client, in the example form of a client application 604 (e.g., client software supporting user cryptocurrency wallets), are hosted and execute on the client device 608. The networked system 616 includes one or more servers 622 (e.g., servers hosting services exposing remote procedure call APIs), which hosts a processing system 606 (such as the processing system described above according to various embodiments of the present disclosure supporting a cryptocurrency transaction proxy service) that provides a number of functions and services via a service oriented architecture (SOA) and that exposes services to the client application 604 that accesses the networked system 616 where the services may correspond to particular workflows. The client application 604 also provides a number of interfaces described herein, which can present an output in accordance with the methods described herein to a user of the client device 608.

The client device 608 enables a user to access and interact with the networked system 616 and, ultimately, the processing system 606. For instance, the user provides input (e.g., touch screen input or alphanumeric input) to the client device 608, and the input is communicated to the networked system 616 via the network 610. In this instance, the networked system 616, in response to receiving the input from the user, communicates information back to the client device 608 via the network 610 to be presented to the user.

An API server 618 and a web server 620 are coupled, and provide programmatic and web interfaces respectively, to the servers 622. For example, the API server 618 and the web server 620 may produce messages (e.g., RPC calls) in response to inputs received via the network, where the messages are supplied as input messages to workflows orchestrated by the processing system 606. The API server 618 and the web server 620 may also receive return values (return messages) from the processing system 606 and return results to calling parties (e.g., web clients 602 and client applications 604 running on client devices 608 and third-party applications 614) via the network 610. The servers 622 host the processing system 606, which includes components or applications in accordance with embodiments of the present disclosure as described above. The servers 622 are, in turn, shown to be coupled to one or more database servers 624 that facilitate access to information storage repositories (e.g., databases 626). In an example embodiment, the databases 626 includes storage devices that store information accessed and generated by the processing system 606, such as the persistent store 280 of FIG. 2 and the persistent store 680 of FIG. 6 and other databases such as databases storing permissions associated with user cryptocurrency wallets and/or proxy cryptocurrency wallets, user account information, user account balances, and the like.

Additionally, a third-party application 614, executing on one or more third-party servers 621, is shown as having programmatic access to the networked system 616 via the programmatic interface provided by the API server 618. For example, the third-party application 614, using information retrieved from the networked system 616, may support one or more features or functions on a website hosted by a third-party. For example, the third-party application 614 may serve as a data source for retrieving, for example, transaction information and/or price information regarding transaction fees and exchange rates and may also be accessed by the processing system 606 (e.g., by a proxy cryptocurrency wallet).

Turning now specifically to the applications hosted by the client device 608, the web client 602 may access the various systems (e.g., the processing system 606) via the web interface supported by the web server 620. Similarly, the client application 604 (e.g., an "app" such as a payment processor app) may access the various services and functions provided by the processing system 606 via the programmatic interface provided by the API server 618. The client application 604 may be, for example, an "app" executing on the client device 608, such as an iOS or Android OS application to enable a user to access and input data on the networked system 616 in an offline manner and to perform batch-mode communications between the client application 604 and the networked system 616.

Further, while the network architecture 600 shown in FIG. 6 employs a client-server architecture, the present disclosure is not limited to such an architecture, and could equally well find application in a distributed, or peer-to-peer, architecture system, for example.

Figure 7:
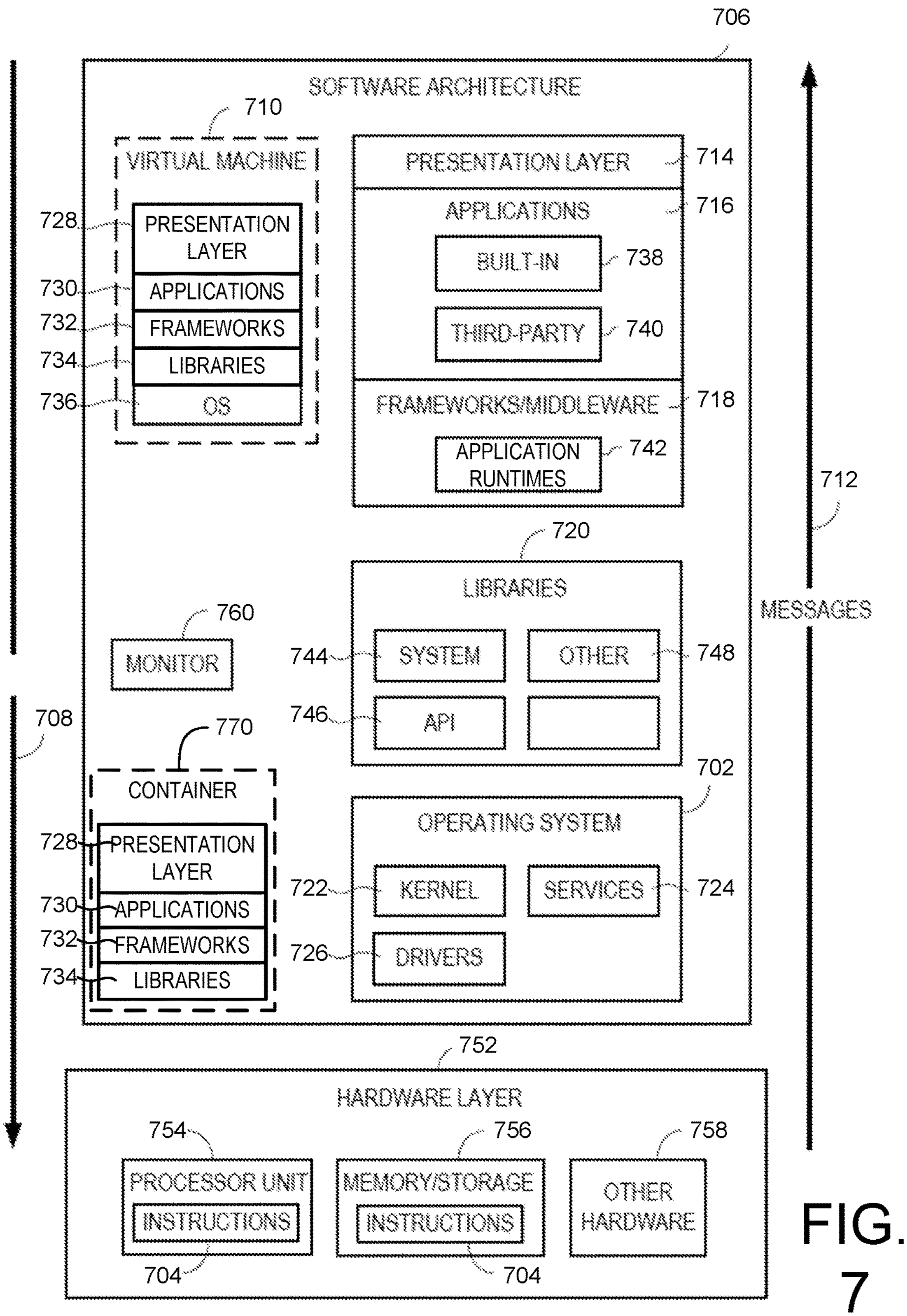
FIG. 7 is a block diagram illustrating a representative software architecture, which may be used in conjunction with various hardware architectures as described herein.

FIG. 7 is a block diagram illustrating an example software architecture 706, which may be used in conjunction with various hardware architectures herein described. FIG. 7 is a non-limiting example of a software architecture 706, and it will be appreciated that many other architectures may be implemented to facilitate the functionality described herein. The software architecture 706 may execute on hardware such as a machine 800 of FIG. 8 that includes, among other things, processors 804, memory/storage 806, and input/output (I/O) components 818. A representative hardware layer 752 is illustrated and can represent, for example, the machine 800 of FIG. 8. The representative hardware layer 752 includes a processor 754 having associated executable instructions 704. The executable instructions 704 represent the executable instructions of the software architecture 706, including implementation of the methods, components, and so forth described herein. The hardware layer 752 also includes non-transitory memory and/or storage modules as memory/storage 756, which also have the executable instructions 704. The hardware layer 752 may also include other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716 (such as the services of the processing system), and a presentation layer 714. Operationally, the applications 716 and/or other components within the layers may invoke API calls 708 through the software stack and receive a response as messages 712 in response to the API calls 708. The layers illustrated are representative in nature, and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide high-level resource management functions, web application frameworks, application runtimes 742 (e.g., a Java virtual machine or JVM), and so forth. The frameworks/middleware 718 may provide a broad spectrum of other APIs that may be utilized by the applications 716 and/or other software components/modules, some of which may be specific to a particular operating system or platform.

The applications 716 include built-in applications 738 and/or third-party applications 740. The applications 716 may use built-in operating system functions (e.g., kernel 722, services 724, and/or drivers 726), libraries 720, and frameworks/middleware 718 to create user interfaces to interact with users of the system. Alternatively, or additionally, in some systems, interactions with a user may occur through a presentation layer, such as the presentation layer 714. In these systems, the application/component "logic" can be separated from the aspects of the application/component that interact with a user.

Some software architectures use virtual machines. In the example of FIG. 7, this is illustrated by a virtual machine 710. The virtual machine 710 creates a software environment where applications/components can execute as if they were executing on a hardware machine (such as the machine 800 of FIG. 8, for example). The virtual machine 710 is hosted by a host operating system (e.g., the operating system 702 in FIG. 7) and typically, although not always, has a virtual machine monitor 760 (or hypervisor), which manages the operation of the virtual machine 710 as well as the interface with the host operating system (e.g., the operating system 702). A software architecture executes within the virtual machine 710 such as an operating system (OS) 736, libraries 734, frameworks 732, applications 730, and/or a presentation layer 728. These layers of software architecture executing within the virtual machine 710 can be the same as corresponding layers previously described or may be different.

Some software architectures use containers 770 or containerization to isolate applications. The phrase "container image" refers to a software package (e.g., a static image) that includes configuration information for deploying an application, along with dependencies such as software components, frameworks, or libraries that are required for deploying and executing the application. As discussed herein, the term "container" refers to an instance of a container image, and an application executes within an execution environment provided by the container. Further, multiple instances of an application can be deployed from the same container image (e.g., where each application instance executes within its own container). Additionally, as referred to herein, the term "pod" refers to a set of containers that accesses shared resources (e.g., network, storage), and one or more pods can be executed by a given computing node. A container 770 is similar to a virtual machine in that it includes a software architecture including libraries 734, frameworks 732, applications 730, and/or a presentation layer 728, but omits an operating system and, instead, communicates with the underlying host operating system 702.

Figure 8:
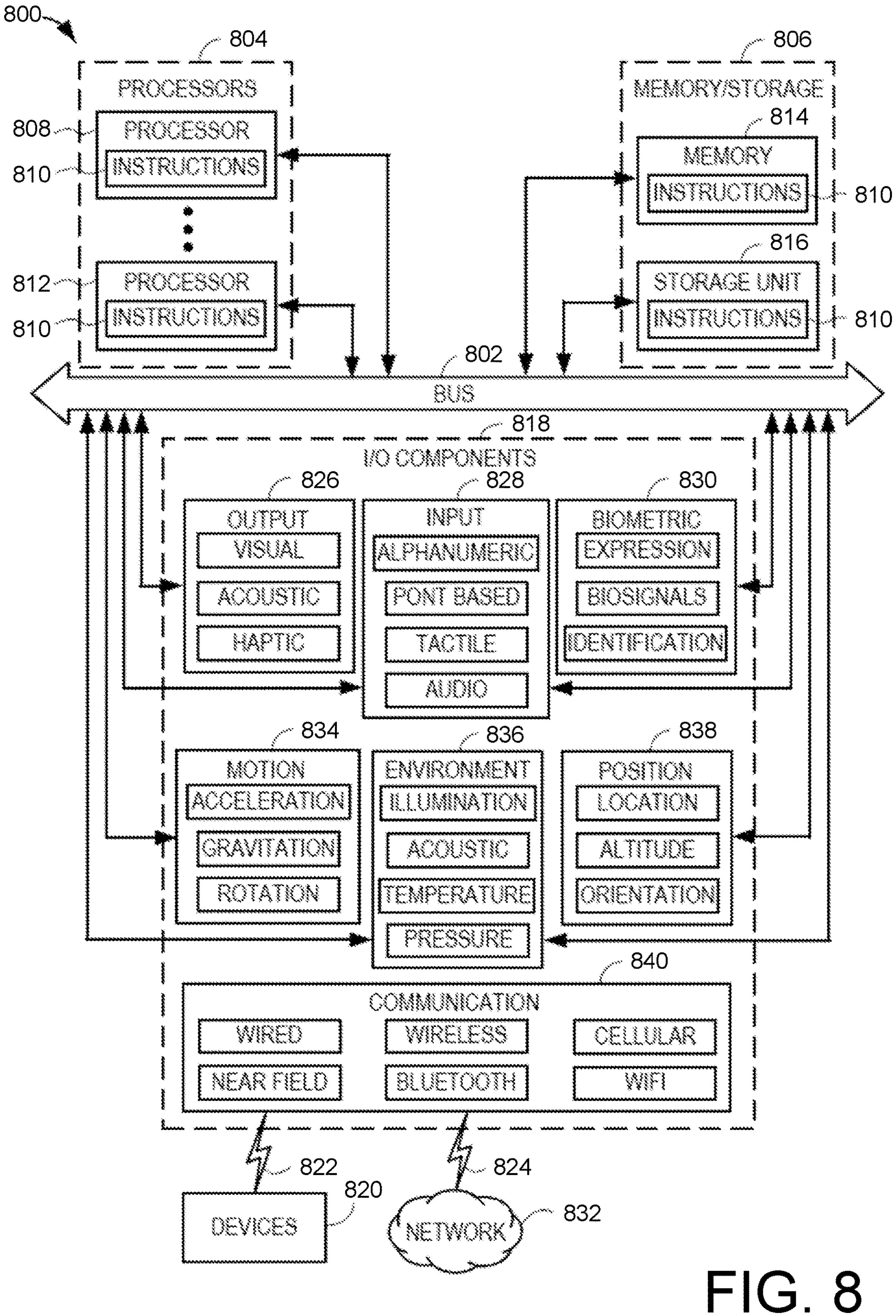
FIG. 8 is a block diagram illustrating components of a processing circuit or a processor, according to some example embodiments, configured to read instructions from a non-transitory computer-readable medium (e.g., a non-transitory machine-readable storage medium) and perform any one or more of the methods discussed herein.

FIG. 8 is a block diagram illustrating components of a machine 800, according to some example embodiments, able to read instructions from a non-transitory machine-readable medium (e.g., a computer-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or in parallel or concurrently, that specify actions to be taken by the machine 800. Further, while only a single machine 800 is illustrated, the term "machine" or "processing circuit" shall also be taken to include a collection of machines that individually or jointly execute the instructions 810 to perform any one or more of the methodologies discussed herein.

The machine 800 may include processors 804 (including processors 808 and 812), memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine will depend on the type of machine. For example, portable machines such as mobile phones may include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion, and the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting an NFC beacon signal that may indicate a particular location, and so forth.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art. Further, as used herein and in the claims, the phrase "at least one of element A, element B, or element C" is intended to convey any of: element A, element B, element C, elements A and B, elements A and C, elements B and C, and elements A, B, and C.

According to one embodiment of the present disclosure, a method for managing access to data in a cloud-based software platform includes: generating, by a first cloud-based software application running on the cloud-based software platform, first data associated with a user account on the cloud-based software platform; connecting a second cloud-based software application running on the cloud-based software platform to the user account; receiving a data access request from the second cloud-based software application, the data access request requesting access to the first data generated by the first cloud-based software application; retrieving a collection of access permissions on the first data generated by the first cloud-based software application controlling access to the first data by the second cloud-based software application, the collection of access permissions being set by the user account; and granting the second cloud-based software application access to the first data subject to the collection of access permissions.

The collection of access permissions may be defined by the first cloud-based software application.

The first data may include an event stream.

The retrieving the collection of access permissions may include: displaying, to an authorized user of the user account, a prompt to set the collection of access permissions associated with the first data generated by the first cloud-based software application to control access to the first data by the second cloud-based software application; and setting the collection of access permissions based on a response to the prompt.

The may further include: receiving a second data access request from the second cloud-based software application based on a change in the second cloud-based software application; and displaying, to an authorized user of the user account, a prompt to set the collection of access permissions associated with the first data generated by the first cloud-based software application to control access to the first data based on the change to the second cloud-based software application; and updating the collection of access permissions based on a response to the prompt.

The second cloud-based software application may be configured to: generate a plurality of second data based on the first data; and write the second data generated by the second cloud-based software application to a user cloud data store associated with the user account.

A secondary platform on the cloud-based software platform may integrate the first cloud-based software application and the second cloud-based software application and may manage a plurality of user accounts on the cloud-based software platform, the plurality of user accounts including the user account, and the user account may delegate control of the collection of access permissions associated with the first data to the secondary platform.

The secondary platform may be configured to display, to an administrator account associated with the user account, a request to set the collection of access permissions associated with the first data.

According to one embodiment of the present disclosure, a cloud-based software platform includes: a processor; and a memory storing instructions that, when executed by the processor, cause the processor to: connect a cloud-based software application running on the cloud-based software platform to a user account; receive a data access request from the cloud-based software application, the data access request requesting access to first data stored in a data store of the cloud-based software platform, the data store being associated with a user account on the cloud-based software platform; retrieve a collection of access permissions on the first data controlling access to the first data by the cloud-based software application, the collection of access permissions being set by the user account; and grant the cloud-based software application access to the first data subject to the collection of access permissions.

The first data may be structured in accordance with a first data schema, and the collection of access permissions may be defined by the first data schema.

The first data may include an event stream.

The instructions to retrieve the collection of access permissions may include instructions that, when executed by the processor, cause the processor to: display, to an authorized user of the user account, a prompt to set the collection of access permissions associated with the first data to control access to the first data by the cloud-based software application; and set the collection of access permissions based on a response to the prompt.

The memory may further store instructions that, when executed by the processor, cause the processor to: receive a second data access request from the cloud-based software application based on a change in the cloud-based software application; and display, to an authorized user of the user account, a prompt to set the collection of access permissions associated with the first data to control access to the first data based on the change to the cloud-based software application; and update the collection of access permissions based on a response to the prompt.

The cloud-based software application may be configured to: generate a plurality of second data based on the first data; and write the second data generated by the cloud-based software application to the data store associated with the user account.

A secondary platform on the cloud-based software platform may integrate the cloud-based software application and may manage a plurality of user accounts on the cloud-based software platform, the plurality of user accounts including the user account, and the user account may delegate control of the collection of access permissions associated with the first data to the secondary platform.

The secondary platform may be configured to display, to an administrator account associated with the user account, a request to set the collection of access permissions associated with the first data.

According to one embodiment of the present disclosure, a non-transitory computer-readable medium stores instructions that, when executed by a processor, cause the processor to: connect a cloud-based software application running on a cloud-based software platform to a user account; receive a data access request from the cloud-based software application, the data access request requesting access to first data stored in a data store of the cloud-based software platform, the data store being associated with a user account on the cloud-based software platform; retrieve a collection of access permissions on the first data controlling access to the first data by the cloud-based software application, the collection of access permissions being set by the user account; and grant the cloud-based software application access to the first data subject to the collection of access permissions.

The first data may be structured in accordance with a first data schema, and the collection of access permissions may be defined by the first data schema.

The first data may include an event stream.

The cloud-based software application may be configured to: generate a plurality of second data based on the first data; and write the second data generated by the cloud-based software application to the data store associated with the user account.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method for managing access to data in a cloud-based software platform, the method comprising:

generating, by a first cloud-based software application running on the cloud-based software platform, first data and saving the first data to a first user cloud data store owned by a first user account on the cloud-based software platform, wherein the cloud-based software platform stores a plurality of user cloud data stores comprising:

the first user cloud data store owned by the first user account, and a second user cloud data store owned by a second user account;

connecting a second cloud-based software application running on the cloud-based software platform to the first user account, connecting comprising setting a first collection of access permissions controlling access by the second cloud-based software application to the first data stored in the first user cloud data store;

receiving a data access request from the second cloud-based software application to request access to the first data generated by the first cloud-based software application and stored in the first user cloud data store owned by the first user account;

retrieving the first collection of access permissions from a plurality of collections of access permissions, the plurality of collections of access permissions comprising:

the first collection of access permissions, and a second collection of access permissions set by the second user account and controlling access by a third cloud-based software application to second data stored by a fourth cloud-based software application in the second user cloud data store;

updating the first collection of access permissions based on an updated version of the second cloud-based software application, updating comprising prompting the first user account to update the first collection of access permissions; and granting the second cloud-based software application access to the first data subject to the updated first collection of access permissions.

2. The method of claim 1, wherein the first collection of access permissions is defined by the first cloud-based software application.

3. The method of claim 1, wherein the first data comprises an event stream.

4. The method of claim 1, further comprising:

generating, by the second cloud-based software application, a plurality of third data based on the first data; and writing the third data generated by the second cloud-based software application to the first user cloud data store associated with the first user account.

5. The method of claim 1, wherein a secondary platform on the cloud-based software platform integrates the first cloud-based software application and the second cloud-based software application and manages a plurality of user accounts on the cloud-based software platform, the plurality of user accounts comprising the first user account, and wherein the first user account delegates control of the first collection of access permissions associated with the first data to the secondary platform.

6. The method of claim 5, wherein the secondary platform is configured to display, to an administrator account associated with the first user account, a request to set the first collection of access permissions associated with the first data.

7. A cloud-based software platform comprising:

a processor; and a memory storing instructions that, when executed by the processor, cause the processor to:

connect a second cloud-based software application running on the cloud-based software platform to a first user account of a plurality of user accounts, comprising setting a first collection of access permissions controlling access by the second cloud-based software application to first data generated by a first cloud-based software application and stored in a first user cloud data store owned by the first user account, wherein the cloud-based software platform stores a plurality of data stores comprising:

the first user cloud data store owned by the first user account; and a second user cloud data store owned by a second user account of the plurality of user accounts on the cloud-based software platform;

retrieve the first collection of access permissions from a plurality of collections of access permissions, the plurality of collections of access permissions comprising:

the first collection of access permissions, and a second collection of access permissions set by the second user account and controlling access by a third cloud-based software application to second data stored by a fourth cloud-based software application in the second user cloud data store;

update the first collection of access permissions based on an updated version of the second cloud-based software application, comprising prompting the first user account to update the first collection of access permissions; and grant the second cloud-based software application access to the first data subject to the updated first collection of access permissions.

8. The cloud-based software platform of claim 7, wherein the first data is structured in accordance with a first data schema, and wherein the first collection of access permissions is defined by the first data schema.

9. The cloud-based software platform of claim 7, wherein the first data comprises an event stream.

10. The cloud-based software platform of claim 7, wherein the second cloud-based software application is configured to:

generate a plurality of third data based on the first data; and write the third data generated by the second cloud-based software application to the first user cloud data store associated with the first user account.

11. The cloud-based software platform of claim 7, wherein a secondary platform on the cloud-based software platform integrates the first cloud-based software application and the second cloud-based software application and manages the plurality of user accounts on the cloud-based software platform, the plurality of user accounts comprising the first user account, and wherein the first user account delegates control of the first collection of access permissions associated with the first data to the secondary platform.

12. The cloud-based software platform of claim 11, wherein the secondary platform is configured to display, to an administrator account associated with the first user account, a request to set the first collection of access permissions associated with the first data.

13. A non-transitory computer-readable medium storing instructions that, when executed by a processor, cause the processor to:

connect a second cloud-based software application running on a cloud-based software platform to a first user account of a plurality of user accounts, comprising setting a first collection of access permissions controlling access by the second cloud-based software application to first data generated by a first cloud-based software application and stored in a first user cloud data store owned by the first user account, wherein the cloud-based software platform stores a plurality of data stores comprising:

the first user cloud data store owned by the first user account; and a second user cloud data store owned by a second user account of the plurality of user accounts on the cloud-based software platform;

retrieve the first collection of access permissions from a plurality of collections of access permissions, the plurality of collections of access permissions comprising:

the first collection of access permissions, and a second collection of access permissions set by the second user account and controlling access by a third cloud-based software application to second data stored by a fourth cloud-based software application in the second user cloud data store;

update the first collection of access permissions based on an updated version of the second cloud-based software application, comprising prompting the first user account to update the first collection of access permissions; and grant the second cloud-based software application access to the first data subject to the updated first collection of access permissions.

14. The non-transitory computer-readable medium of claim 13, wherein the first data is structured in accordance with a first data schema, and wherein the first collection of access permissions is defined by the first data schema.

15. The non-transitory computer-readable medium of claim 13, wherein the first data comprises an event stream.

16. The non-transitory computer-readable medium of claim 13, wherein the second cloud-based software application is configured to:

generate a plurality of third data based on the first data; and write the third data generated by the first cloud-based software application to the first user cloud data store associated with the first user account.

* * * * *